(12) United States Patent
Faxér et al.

(10) Patent No.: US 10,560,161 B2
(45) Date of Patent: Feb. 11, 2020

(54) HIGH SPATIAL RESOLUTION BEAM SPACE CSI FEEDBACK

(71) Applicant: Telefonaktiebolaget LM Ericsson (publ), Stockholm (SE)

(72) Inventors: Sebastian Faxér, Järfälla (SE); Niklas Wernersson, Kungsängen (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 200 days.

(21) Appl. No.: 15/554,243

(22) PCT Filed: Jun. 29, 2017

(86) PCT No.: PCT/SE2017/050725
§ 371 (c)(1),
(2) Date: Aug. 29, 2017

(87) PCT Pub. No.: WO2019/004886
PCT Pub. Date: Jan. 3, 2019

(65) Prior Publication Data
US 2019/0007112 A1    Jan. 3, 2019

(51) Int. Cl.
*H04B 7/06*     (2006.01)
*H04B 7/0456*   (2017.01)
*H04B 7/0417*   (2017.01)

(52) U.S. Cl.
CPC ......... *H04B 7/0478* (2013.01); *H04B 7/0417* (2013.01); *H04B 7/0626* (2013.01)

(58) Field of Classification Search
CPC .. H04B 7/0478; H04B 7/0417; H04B 7/0456; H04B 7/0469; H04B 7/0626
See application file for complete search history.

(56) References Cited

U.S. PATENT DOCUMENTS

| 2013/0303090 A1* | 11/2013 | Hammarwall | ....... H04B 7/0456 455/67.13 |
| 2014/0112173 A1* | 4/2014 | Hammarwall | ........ H04L 1/0026 370/252 |

FOREIGN PATENT DOCUMENTS

| WO | WO-2016024912 A2 * | 2/2016 | ........... H04B 7/0469 |
| WO | 2017039511 A1 | 3/2017 | |

* cited by examiner

*Primary Examiner* — Ted M Wang
(74) *Attorney, Agent, or Firm* — Murphy, Bilak & Homiller, PLLC

(57) ABSTRACT

A method in a radio communications network, the network comprising a base station and at least one user equipment, UE, wherein the base station comprises an antenna array comprising a plurality of antenna elements, the method being implemented in the base station and comprising the steps of precoding (1101) a multi-dimensional channel state information reference signal, CSI-RS, with a precoding virtualization matrix such that each antenna element of the antenna array is associated with a non-zero weight in at least two precoders of the precoding virtualization matrix, transmitting (1102) the multi-dimensional channel state information reference signal to a UE, receiving (1103) an identifier from the UE, wherein the identifier identifies a selected precoder from a codebook using (1104) the selected precoder to identify a desired precoder and transmitting (1105) a data signal to the UE using the desired precoder.

14 Claims, 20 Drawing Sheets

HIGH SPATIAL RESOLUTION BEAM SPACE CSI FEEDBACK

FIELD OF INVENTION

The field of the invention is transmission systems equipped with multiple antennas.

BACKGROUND

Multi-antenna techniques can significantly increase the data rates and reliability of a wireless communication system. The performance is in particular improved if both the transmitter and the receiver are equipped with multiple antennas, which results in a multiple-input multiple-output (MIMO) communication channel. Such systems and/or related techniques are commonly referred to as MIMO.

An antenna array is a set of multiple connected antennas which work together as a single antenna, to transmit or receive radio waves. The individual antenna elements are connected to a single receiver or transmitter by feedlines that feed the power to the elements in a specific phase relationship. The radio waves radiated by each individual antenna combine and superpose, adding together (interfering constructively) to enhance the power radiated in desired directions, and cancelling (interfering destructively) to reduce the power radiated in other directions.

FIG. 1 is a diagram illustrating the basic principle of MIMO communications, for a system with two transmitters and two receivers. A transmitter 101 has two antennas 102, 103, which transmit signals to a receiver 104, which has two antennas 105, 106. The signals propagate through different paths 107, 108, 109, 110. This feature may be used to provide improved performance by exploiting spatial diversity to improve reliability in poor channel conditions or to increase the data rate by spatial multiplexing in good conditions.

The Long term Evolution (LTE) standard is currently evolving with enhanced MIMO support. A core component in LTE is the support of MIMO antenna deployments and MIMO related techniques. LTE release 13 supports spatial multiplexing for 16 transmit ($T_x$) antennas with channel dependent precoding. The spatial multiplexing mode is aimed for high data rates in favorable channel conditions. Typically such systems involve a technique known as precoding, which involves the application of phase and gain shifts to optimise multipath propagation. FIG. 2 is a schematic diagram illustrating the application of precoding to signals. FIG. 2 illustrates a plurality of data streams or layers 201. The data streams are represented by an information carrying vector s 202, which comprises a plurality of symbols r. Each of the r symbols corresponds to a layer. r is referred to as the transmission rank. The symbol vector s 202 is multiplied 203 by an $N_T \times r$ precoder matrix W, which serves to distribute the transmit energy in a subspace of the $N_T$ (corresponding to $N_T$ antenna ports) dimensional vector space. An Inverse Fast Fourier 204 Transform applied. The signals are then sent to antenna ports 205. The ports may then be mapped onto antenna elements. This mapping may involve the simple mapping of one port to one antenna, or it may involve the mapping of the signals to combinations of antenna elements by means of a virtualization matrix.

In this way, spatial multiplexing is achieved since multiple symbols can be transmitted simultaneously over the same Time/Frequency Resource Element (TFRE). The number of symbols r is typically adapted to suit the current channel properties.

LTE uses Orthogonal Frequency Division Multiplexing (OFDM) in the downlink (and Discrete Fourier Transform (DFT) precoded OFDM in the uplink) and hence the received $N_R \times 1$ vector $y_n$ for a certain TFRE on subcarrier n (or alternatively data TFRE number n) is thus modelled by:

$$y_n = H_n W s_n + e_n \quad (1)$$

where $e_n$ is a noise/interference vector obtained as realizations of a random process. $H_n$ is the channel matrix, which represents the effects of a multipath channel on a signal between a given transmitter and a given receiver. $H_n$ is an $N_R \times N_T$ matrix, wherein $N_T$ is the number of transmitters and $N_R$ is the number of receivers.

The precoder matrix can be a wideband precoder, which is constant over frequency, or frequency selective. The precoder matrix is often chosen to match the characteristics of the $N_R \times N_T$ MIMO channel matrix $H_n$, resulting in so-called channel dependent precoding. The aim is to focus the transmit energy into a subspace which is strong in the sense of conveying much of the transmitted energy to the UE. Furthermore, the transmission rank, and thus the number of spatially multiplexed layers, is reflected in the number of columns of the precoder. For efficient performance it is therefore of critical importance to obtain information about the channel $H_n$, this information is commonly referred to as channel state information (CSI). A technique for determining the channel state information is to provide a reference signal, which provides a known symbol, which, on detection, can be used to determine the channel state. This type of signal is known as a Channel State Information reference signal (CSI-RS).

There are two main methodologies for transmitting CSI-RS in a system with many steerable antennas: non-precoded or precoded CSI-RS. With non-precoded CSI-RS, a single CSI-RS resource is used, which comprises many antenna ports, and typically a separate CSI-RS port is transmitted from each (possibly virtual) antenna element of the array, so that the UE can estimate the full high-dimensional channel matrix from the many antenna ports. Typically, the UE would then feed-back a CSI report indicating a high-dimensional precoder, such as a DFT precoder. The CSI-RS in this case is then intended to be cell-specific, i.e. broadcasted over the entire cell coverage area. FIG. 3 is a schematic diagram illustrating a non-precoded CSI-RS. There is a multi-antenna array 301, which transmits to user equipment 302. The non-precoded CSI-RS 303 is transmitted by the base station across the cell.

The UE then provides feedback 304 in the form of a Rank Indicator (RI), a Precoder Matrix Index, PMI, and a Channel Quality Indicator (CQI). The RI corresponds to a recommended number of streams that are to be spatially multiplexed and thus transmitted in parallel over the effective channel. The PMI identifies a recommended precoder (in a codebook which contains precoders with the same number of rows as the number of CSI-RS ports) for the transmission, which relates to the spatial characteristics of the effective channel. The CQI represents a recommended transport block size (i.e. code rate) and LTE supports transmission of one or two simultaneous (on different layers) transmissions of transport blocks (i.e. separately encoded blocks of information) to a UE in a subframe. There is thus a relation between a CQI and an SINR of the spatial stream(s) over which the transport block or blocks are transmitted.

Precoded CSI-RS on the other hand can be either UE-specific or cell-specific. In the cell-specific case, typically many CSI-RS resources are transmitted, each resource typically comprising only one antenna port per polarization. The CSI-RS within a CSI-RS resource is typically transmitted from all antenna elements of the array, but precoded with certain beamforming weights to create a narrow beam in a certain direction. The UE would then measure upon all CSI-RS resources and select the best one, corresponding to the best beam direction, and feed back a CSI-RS Resource Indicator (CRI). FIGS. 3 and 4 are diagrams illustrating precoded CSI-RS. FIG. 4 is a schematic diagram of a single precoded CSI RS, which illustrates an antenna array 401 transmitting a single reference signal 403, which has been precoded to form a beam, to a UE 402. FIG. 5 is a schematic diagram which illustrates an antenna array 501 transmitting multiple precoded CSI-RS 503, 504, 505, 506 to at least one UE 502.

Using LTE terminology, non-precoded CSI-RS transmission schemes are denoted "Class A eMIMO-Type" while beamformed CSI-RS transmission schemes are denoted "Class B eMIMO-Type".

A common type of precoding is to use a DFT-precoder, where the precoder vector used to precode a single-layer transmission using a single-polarized uniform linear array (ULA) with $N_1$ antennas is defined as:

$$w_{1D}(l, N_1, O_1) = \frac{1}{\sqrt{N_1}} \begin{bmatrix} e^{j2\pi \cdot 0 \frac{l}{O_1 N_1}} \\ e^{j2\pi \cdot 1 \frac{l}{O_1 N_1}} \\ \vdots \\ e^{j2\pi \cdot (N_1-1) \frac{l}{O_1 N_1}} \end{bmatrix} \quad (2)$$

wherein $l=0, 1, \ldots O_1 N_1 - 1$ is the precoder index and $O_1$ is an integer oversampling factor. A precoder for a dual-polarized uniform linear array (ULA) with $N_1$ antennas per polarization (and so $2N_1$ antennas in total) can be similarly defined as $$w_{1D,DP}(l, N_1, O_1) = \begin{bmatrix} w_{1D}(l) \\ e^{j\phi} w_{1D}(l) \end{bmatrix} = \begin{bmatrix} w_{1D}(l) & 0 \\ 0 & w_{1D}(l) \end{bmatrix} \begin{bmatrix} 1 \\ e^{j\phi} \end{bmatrix} \quad (3)$$

where $e^{j\phi}$ is a co-phasing factor between the two polarizations that may for instance be selected from a QPSK alphabet $$\phi \in \left\{0, \frac{\pi}{2}, \pi, \frac{3\pi}{2}\right\}.$$

Recent development in 3GPP has led to the discussion of two-dimensional antenna arrays where each antenna element has an independent phase and amplitude control, thereby enabling beamforming in both in the vertical and the horizontal dimension. Such antenna arrays may be (partly) described by the number of antenna columns corresponding to the horizontal dimension $M_h$, the number of antenna rows corresponding to the vertical dimension $M_v$ and the number of dimensions corresponding to different polarizations $M_p$. The total number of antennas is thus $M=M_h M_v M_p$. A special subset of 2D antenna arrays are 1D arrays which is the set of antenna arrays where $M_h=1$ and $M_v>1$ or $M_h>1$ and $M_v=1$. FIG. 6 is a representation of such an antenna design. It comprises an array of m by n cross-polarized antenna elements 601. In this example $M_h=4$, $M_v=8$ I and $M_p=2$. Such an antenna is denoted as an 8×4 antenna array with cross-polarized antenna elements.

The concept of an antenna element is non-limiting in the sense that it can refer to any virtualization (e.g., linear mapping) of a transmitted signal to the physical antenna elements. For example, groups of physical antenna elements could be fed the same signal, and hence they share the same virtualized antenna port when observed at the receiver. Hence, the receiver cannot distinguish and measure the channel from each individual antenna element within the group of element that are virtualized together. Therefore, when transmitting for instance CSI-RS corresponding to $N_T$ antenna ports it is not necessarily so that $N_T$ equals the number of antenna elements used for the transmission. Hence, the number of antenna elements and the number of antenna ports may or may not need equal each other.

A corresponding precoder vector for a two-dimensional uniform planar arrays (UPA) with $N_1 \times N_2$ antennas can be created by taking the Kronecker product of two precoder vectors as:

$$w_{2D}(l,m) = w_{1D}(l, N_1, O_1) \otimes w_{1D}(m, N_2, O_2) \quad (4)$$

where $O_2$ is an integer oversampling factor in the $N_2$ dimension. Each precoder $w_{2D}(l,m)$ forms a DFT beam, all the precoders $\{w_{2D}(l,m), l=0, \ldots N_1 O_1-1; m=0, \ldots, N_2 O_2-1\}$ form a grid of DFT beams. FIG. 7 is a representation of such a set of precoder beams, in which $(N_1,N_2)=(4,2)$ and $(O_1, O_2)=(4,4)$. FIG. 7 illustrates a plurality of orthogonal DFT beams 701 and oversampled beams 702. A specific example of a DFT precoder corresponding to $w_{2D}$ (l=2, m=1) is given 703. The terms DFT beams' and DFT precoders' are used interchangeably.

Extending the precoder for a dual-polarized ULA may then be done as $$w_{2D,DP}(l, m, \phi) = \begin{bmatrix} 1 \\ e^{j\phi} \end{bmatrix} \otimes w_{2D}(l, m) = \quad (5)$$

$$\begin{bmatrix} w_{2D}(l, m) \\ e^{j\phi} w_{2D}(l, m) \end{bmatrix} = \begin{bmatrix} w_{2D}(l, m) & 0 \\ 0 & w_{2D}(l, m) \end{bmatrix} \begin{bmatrix} 1 \\ e^{j\phi} \end{bmatrix}$$

A precoder matrix $W_{2D,DR}$ for multi-layer transmission may be created by appending columns of DFT precoder vectors as $$W_{2D,DP}^{(R)} = [w_{2D,DP}(l_1,m_1,\phi_1) \; w_{2D,DP}(l_2,m_2,\phi_2) \ldots w_{2D,DP}(l_R,m_R,\phi_R)] \quad (6)$$

where R is the number of transmission layers, i.e. the transmission rank. In a special case for a rank-2 DFT precoder, $m_1=m_2=m$ and $l_1=l_2=l$:

$$w_{2D,DP}^{(2)}(l, m, \phi_1, \phi_2) = [w_{2D,DP}(l, m, \phi_1) \; w_{2D,DP}(l, m, \phi_2)] = \quad (7)$$

$$\begin{bmatrix} w_{2D}(l, m) & 0 \\ 0 & w_{2D}(l, m) \end{bmatrix} \begin{bmatrix} 1 & 1 \\ e^{j\phi_1} & e^{j\phi_2} \end{bmatrix}$$

For each rank, all the precoder candidates form a 'precoder codebook' or a 'codebook'. A UE can first determine the rank of the estimated downlink wideband channel based CSI-RS. After the rank is identified, for each sub-band the UE then searches through all the precoder candidates in a codebook for the determined rank to find the best precoder for the sub-band. For example, in case of rank=1, the UE would search through $w_{2D,DP}(k,l,\phi)$ for all the possible (k,l,φ) values. In case of rank=2, the UE would search through $W_{2D,DP}^{(2)}(k,l,\phi_1,\phi_2)$ for all the possible $(k,l,\phi_1,\phi_2)$ values.

With non-precoded CSI-RS, the UE can estimate the full-dimensional channel and feed-back a precoder selection. Thus, the resulting Physical Downlink Shared Channel (PDSCH) beam depends on precoder codebook, which can be very large and have a high spatial granularity.

With DFT codebooks, this corresponds to using a high oversampling factor. However, each CSI-RS is only transmitted using a single antenna element, which has two downsides:

Inefficient power amplifier (PA) utilization: Each CSI-RS is transmitted from only a single PA, which means that only a fraction of the total TX power can be used. This power loss can be mitigated by boosting the power on the CSI-RS by "borrowing" TX power from empty REs where CSI-RS from other antenna ports are transmitted. However, this can only be done to some extent without causing PA linearization problems and intolerable out-of-band emissions. The power loss can also be mitigated by having an OCC across several CSI-RS ports, but this requires that the channel is sufficiently static in time and frequency.

Poor coverage: As the CSI-RS ports are transmitted from a single antenna element, it will not experience any beamforming gain, and so the coverage may be poor, especially for high frequencies where the path loss is significant.

With precoded CSI-RS, on the other hand, each CSI-RS is transmitted from the entire array and so has full PA utilization and the coverage is good since a beamforming gain is experienced. However, precoded CSI-RS suffers from poor spatial resolution compared to the non-precoded CSI-RS scheme as the UE can only select between the beams transmitted on the different CSI-RS resources. Thus, the spatial granularity depends on the number of transmitted CSI-RS and not on the codebook size, so increasing the spatial granularity requires additional DL overhead. If the precoded CSI-RS scheme uses the same number of ports as the non-precoded CSI-RS scheme, the spatial granularity corresponds to a DFT oversampling factor of one, whereas the non-precoded scheme can use any oversampling factor, typically four or eight per spatial dimension, leading to 16-64 times larger spatial granularity.

SUMMARY

According to a first aspect there is provided a method in a radio communications network, the network comprising a base station and at least one user equipment, UE, wherein the base station comprises an antenna array comprising a plurality of antenna elements. The method comprising the steps of precoding a multi-dimensional channel state information reference signal with a precoding virtualization matrix such that each antenna element of the antenna array has a non-zero weight in at least two precoders of the precoders used for transmitting the reference signal, transmitting the multi-dimensional channel state information reference signal to a UE, receiving the identifier from the UE, using the selected precoder to identify a desired precoder, and transmitting a data signal to the UE using the desired precoder.

This allows the UE to select a beam not belonging to the predefined DFT matrix. This allows an improvement in spatial resolution.

In an embodiment, the precoding virtualization matrix is a discrete Fourier transform, DFT, precoder.

In an embodiment, the desired precoder is determined using the selected precoder and the precoding virtualization matrix.

In an embodiment, the codebook comprises a plurality of precoders, calculated by matrix multiplication of a matrix comprising plurality of desired precoders with an inverse of the precoding virtualization matrix.

In an embodiment, the antenna array comprises a first array, and the first array comprises a plurality of subarrays.

In an embodiment, the virtualization matrix is a Kronecker multiplication of a virtualization matrix for the first array and a virtualization matrix for the subarrays.

In an embodiment, the precoder codebook comprises two types of precoder, a first type which relates to a CSI-RS beam and a second type which is a combination of DFT beams.

In an embodiment, the method further comprises, at the UE, receiving the multi-dimensional CSI-RS, determining an effective CSI-RS channel, selecting from a codebook, using the effective CSI-RS channel, a precoder for data transmission from the base station to the UE, and transmitting an identifier for the selected precoder to the base station.

In an embodiment, the method further comprises at the UE receiving the multi-dimensional CSI-RS, identifying from the multi-dimensional CSI-RS a column matrix which is the most advantageous for the UE, selecting from a codebook, a precoder for data transmission from the base station to the UE and transmitting an identifier for the selected precoder to the base station.

According to a second aspect, there is provided an apparatus for use in a base station in a radio communications network, the network comprising a base station and at least one user equipment, UE, wherein the base station comprises an antenna array comprising a plurality of antenna elements. The apparatus comprises a transmitter, a receiver, a memory, and a processor. The apparatus is configured to transmit a plurality channel state information reference signals, CSI-RS, the reference signals being precoded with precoders such that each antenna element of the antenna array has a non-zero weight in at least two precoders of the precoders used for transmitting the reference signal, receive the identifier from a UE, use the selected precoder to identify a desired precoder, and transmit a data signal to the UE using the desired precoder.

According to a third aspect, there is provided an apparatus for use in a user equipment in a radio communications network, the network comprising a base station and at least one user equipment, UE, wherein the base station comprises an antenna array comprising a plurality of antenna elements. The apparatus comprises a transmitter, a receiver, a memory, and a processor. The apparatus is configured to receive a plurality of channel state information reference signals, CSI-RS, the reference signals being precoded with precoders such that each antenna element of the antenna array has a non-zero weight in at least two precoders of the precoders used for transmitting the reference signal, estimate an effective CSI-RS channel, select from a codebook, using the effective CSI-RS channel, a precoder for data transmission from the base station to the UE, and transmit an identifier for the selected precoder to the base station.

According to a fourth aspect, there is provided a computer program, comprising instructions which, when executed on at least one processor, cause the at least one processor to carry out a method according to the first aspect.

According to a fifth aspect, there is provided a computer program product comprising a computer program according to the fourth aspect.

According to a sixth aspect, there is provided a carrier containing the computer program product according to the fifth, wherein the carrier optionally includes an electrical signal, an optical signal, a radio signal, a magnetic tape or disk, an optical disk or a memory stick.

BRIEF DESCRIPTION OF THE FIGURES

The above and other aspects of the present invention will now be described by way of example only, with reference to the following figures.

DETAILED DESCRIPTION

Embodiments will now be described more fully hereinafter with reference to the accompanying drawings, in which certain embodiments are shown. However, other embodiments in many different forms are possible within the scope of the present disclosure. Rather, the following embodiments are provided by way of example so that this disclosure will be thorough and complete, and will fully convey the scope of the disclosure to those skilled in the art.

The present disclosure provides a method of enabling the selection a precoder for a Multi-input Multi-output, MIMO system by transmitting, by a base station, a precoded Channel State Identifier Reference Signal (CSI-RS) which is precoded with a pre-determined Discrete Fourier Transform, DFT, matrix. At the user equipment, a selection may then be made of one of the transmitted DFT beams or a combination of the beams to create an oversampled beam with finer precision.

The method allows full power amplifier, PA, utilisation and good coverage. Good spatial resolution is also attained by the high dimensional code book. The method may be applied to single polarised or dual polarised antenna arrays.

In an embodiment, an antenna array comprising N single polarised antennas is used. At the receiver, there are $N_{rx}$ antennas. Since there are N transmitter antennas, the CSI-RS is an N×1 symbol vector $x_{csi-rs}$. A virtualization matrix F is applied to the signals, which links the antenna ports to the actual antennas.

Figure 1:
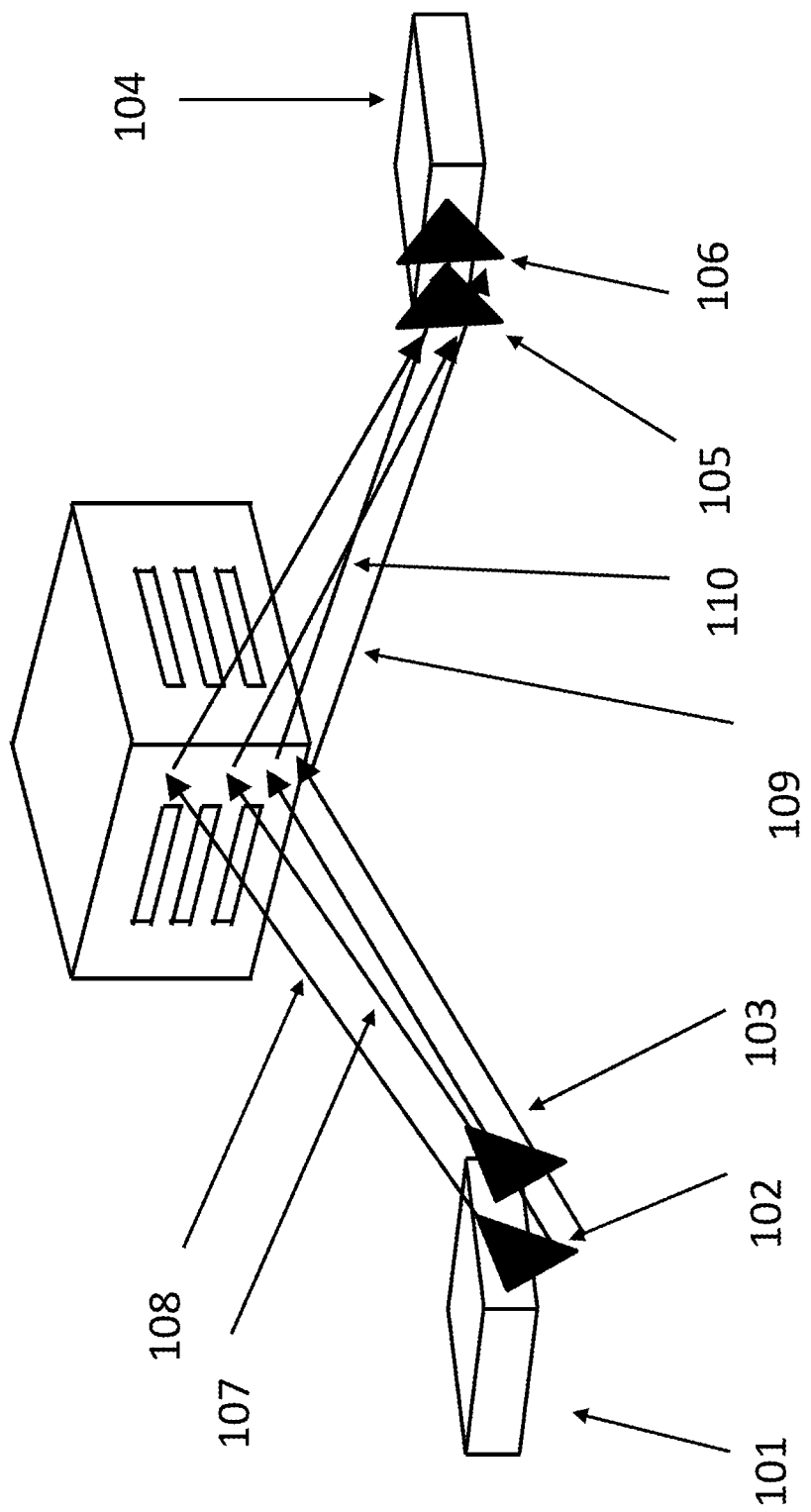
FIG. 1 is a perspective diagram illustrating MIMO transmission.
Figure 2:
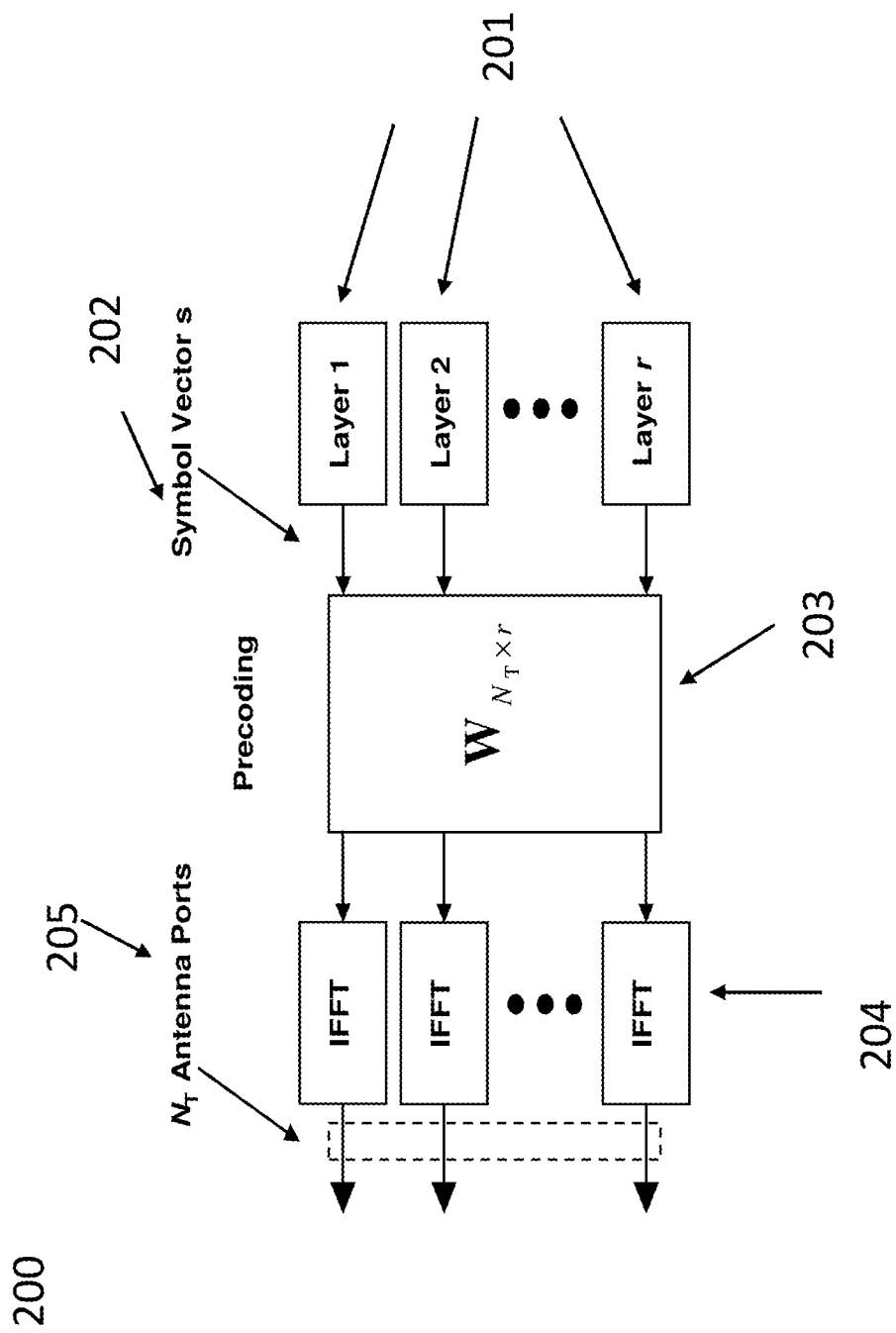
FIG. 2 is a schematic diagram illustrating the application of precoding to signals.
Figure 3:
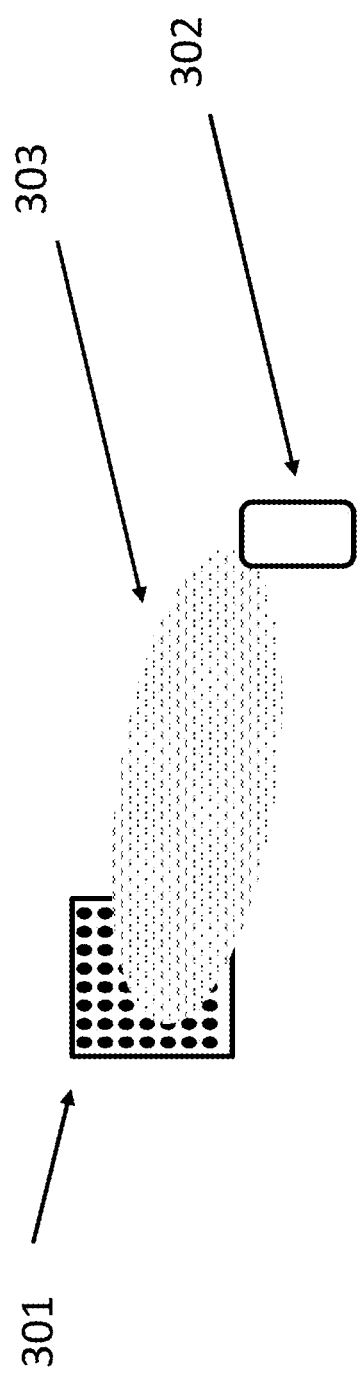
FIG. 3 is a schematic diagram illustrating a non-precoded CSI-RS.
Figure 4:
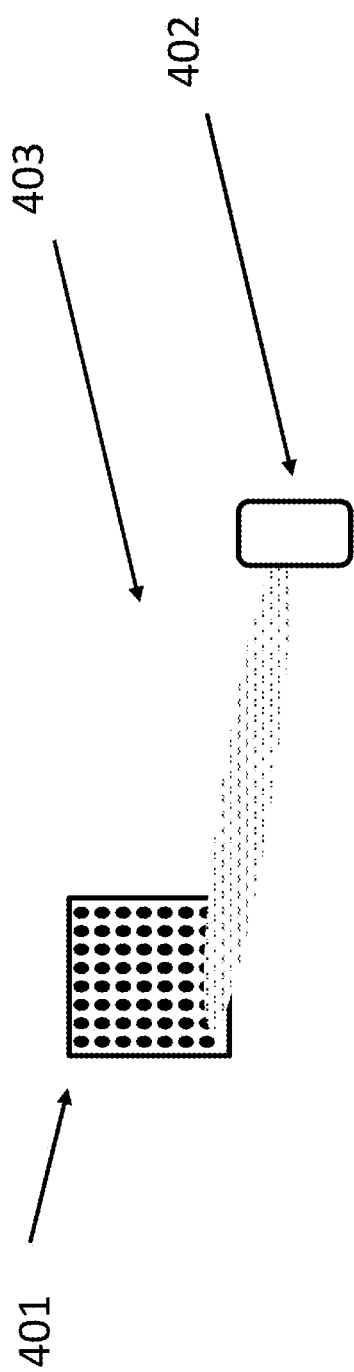
FIG. 4 is a schematic diagram of a single precoded CSI RS.
Figure 5:
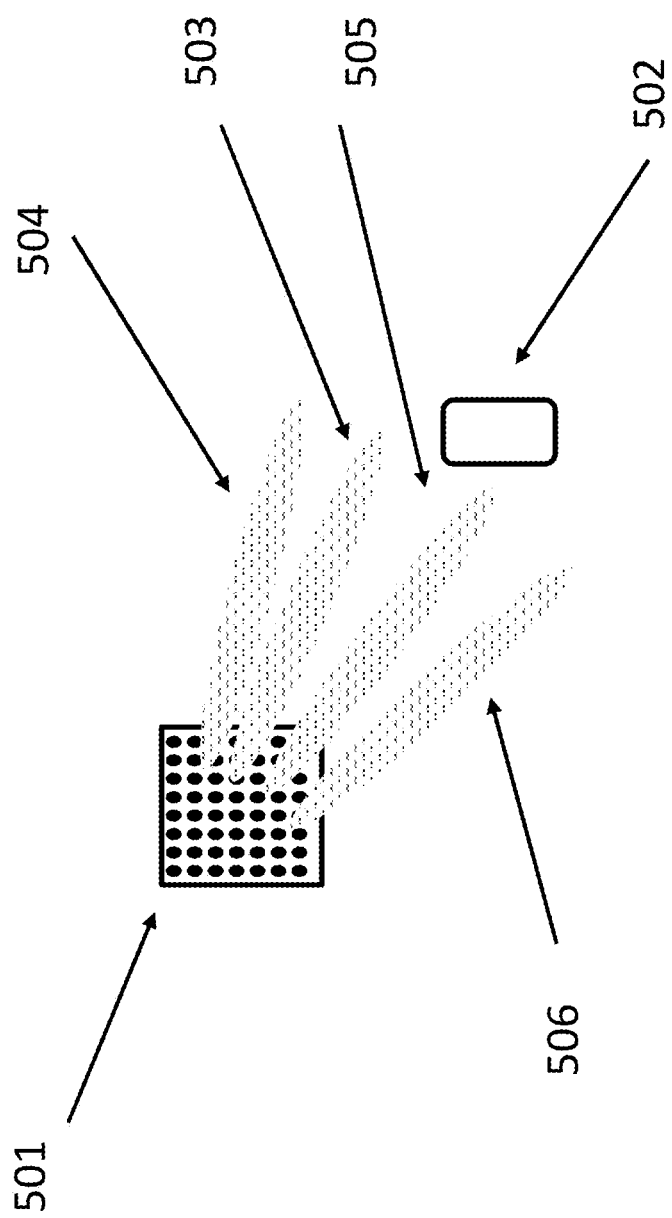
FIG. 5 is a schematic diagram which illustrates an antenna array transmitting multiple precoded CSI-RS.
Figure 6:
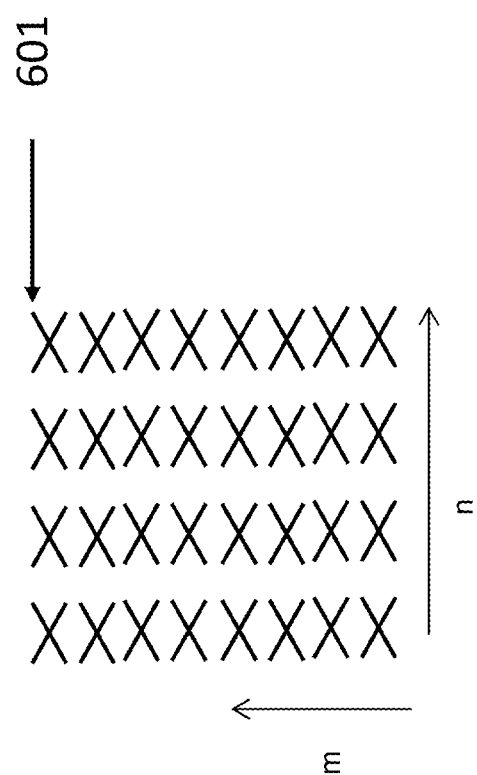
FIG. 6 is a schematic diagram illustrating a two dimensional antenna array.
Figure 7:
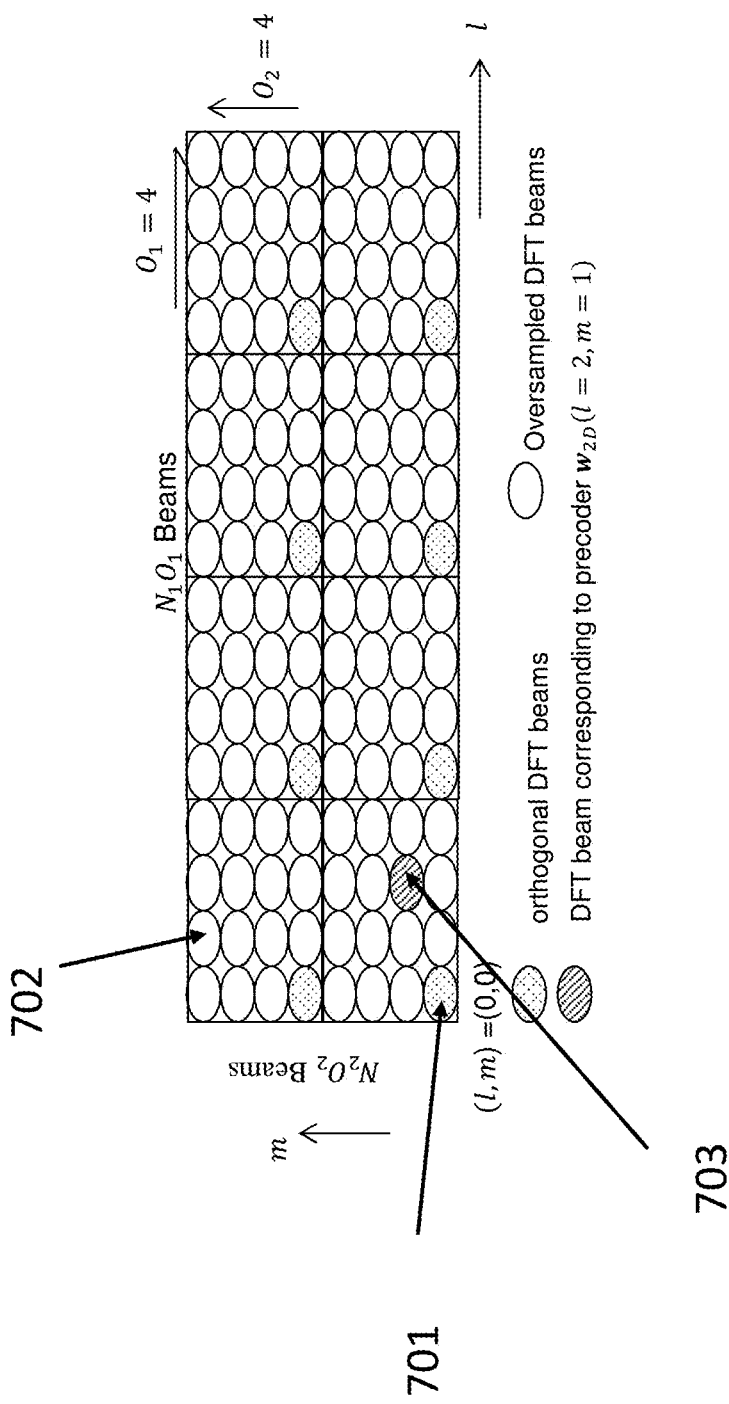
FIG. 7 is a representation of oversampled DFT beams.
Figure 8:
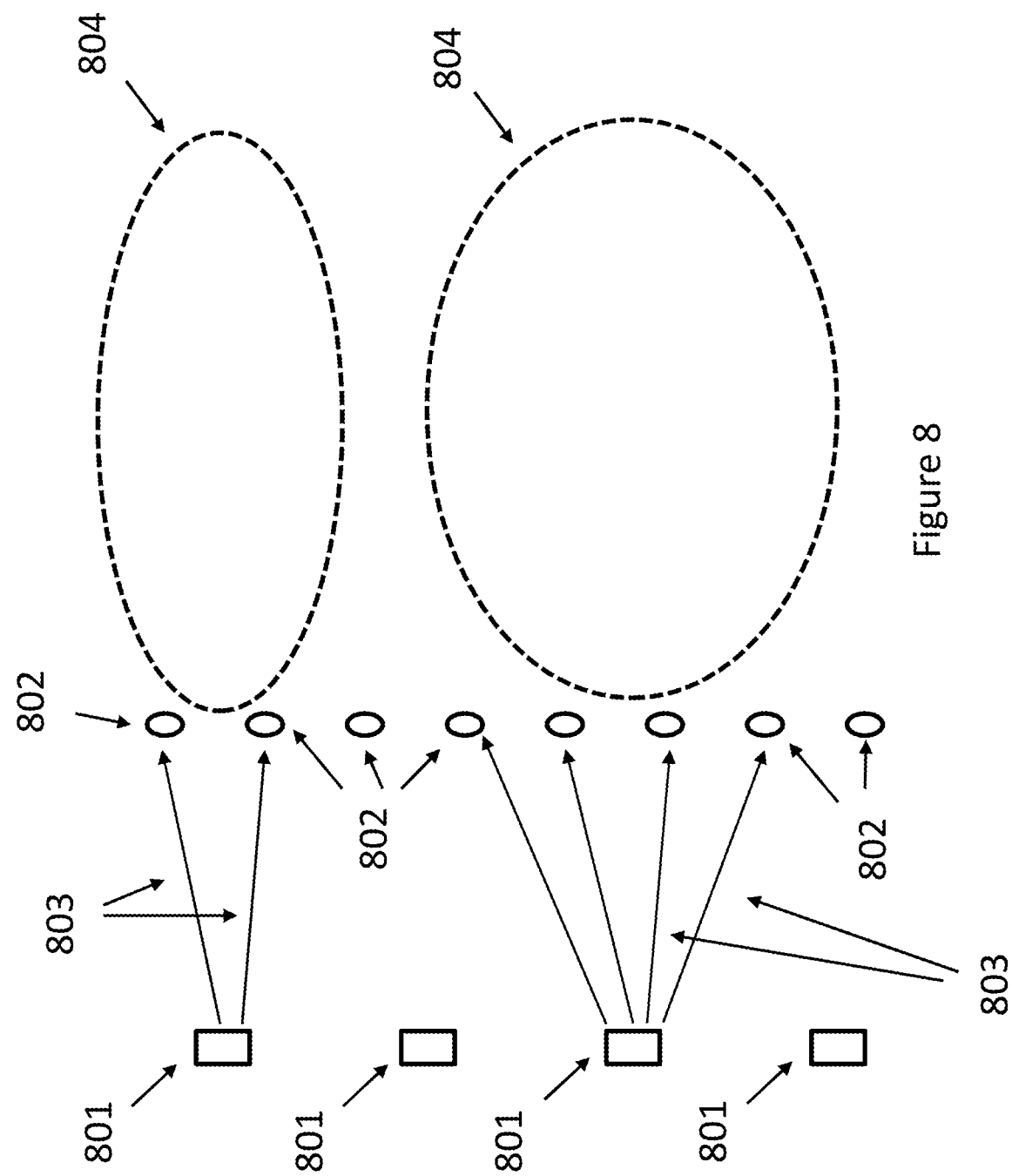
FIG. 8 is a schematic diagram illustrating the process of virtualization.

FIG. 8 is a schematic diagram illustrating the process of virtualization. This process involves the mapping 803 of the signals sent to antenna ports 801 to antennas 802. This process leads to the forming of beams 804.

In an embodiment, the CSI reference signals are precoded with weightings linking antenna ports to antenna elements. In the non-precoded case, the weightings comprise one's for linking a port with its respective antenna and zero's elsewhere. With precoding, there is a spreading of signal energy from a port to multiple antenna elements. In an embodiment, the CSI-RS is precoded with a precoding virtualization matrix such that each antenna element of the antenna array has a non-zero weight in at least two precoders of the precoders used for transmitting the reference signal. Each column of the virtualization matrix corresponds to a "precode" and constitutes the mapping onto antenna elements of a certain CSI-RS antenna port. By precoding the CSI reference signals so that their energy is distributed across multiple antenna ports, a Multidimensional CSI-RS is constructed. The multiple dimension components are vector representations of mappings of the signals from antenna ports to the antenna elements.

The transmitted signal is $Fx_{csi-rs}$. This is subject to the channel matrix H, which is an $N_{RX} \times N$ matrix representing the effects of the channel between each transmitter antenna and each receiver antenna. A noise vector n which is an $N_{RX} \times 1$ vector representing the noise added at each receiver is further applied, with the overall result that the received CSI-RS at the receivers is given by:

$$y_{CSI-RS} = HFx_{CSI-RS} + n \qquad (8)$$

In an embodiment, an assumed virtualization matrix is used to invert the matrix F. By performing the inversion of the matrix F at the user equipment, it will be possible for the UE to derive a suitable precoder for transmitting data in the uplink without using the CSI-RS virtualization matrix F. Hence, a data vector $x_{Data}$, which is of size r×1, may instead be transmitted as $$y_{DATA} = HWx_{Data} + n \qquad (9)$$

where W is a N×r precoder matrix which maps the r symbols to the antenna such that the precoder corresponds to a precoder from the desired codebook.

In an embodiment, the antenna array is a uniform linear array ULA. In an embodiment, the virtualization matrix has elements:

$$[D]_{k,l} = \frac{1}{\sqrt{N}} \exp\left(\frac{j2\pi kl}{N}\right) \quad (10)$$

wherein $l \in \{0, 1, \ldots, N-1\}$ and $k \in \{0, 1, \ldots, N-1\}$, and N is the number of antenna elements.

The purpose is to enable the use of a greater number of precoders than can be provided by a conventional use of the number of antenna elements by use of oversampling to obtain greater spatial resolution.

The transmitted set of N CSI-RS's may be represented as follows:

$$X_{CSI-RS} = [x_{CSI-RS}^1 x_{CSI-RS}^2 \ldots x_{CSI-RS}^N] \quad (11)$$

The received CSI-RS values are the UE may be represented as:

$$Y_{CSI-RS} = HFX_{CSI-RS} + n \quad (12)$$

The UE then estimates the effective CSi-RS channel by performing a channel estimation technique. In an embodiment, least squares estimation is used. The CSI-RS channel may be represented by:

$$H_{CSI-RS} = HF \quad (13)$$

In an embodiment, the UE selects a desired precoder. A precoder search is then performed in a codebook to find a corresponding precoder. In order to perform this search, the Hermitian conjugate of the matrix D is determined and the calculation:

$$C = D^H C_{desired} \quad (14)$$

is performed. By performing a codebook search over the codebook $C=D^H C_{desired}$, using the estimate of $H_{CSI-RS}=HF$, the UE will be able to recommend a precoder $C^i$ from C which in turn will correspond to $C_{desired}^i$ since $HFC^i = HFD^H C_{desired}^i = HDD^H C_{desired}^i = HC_{desired}^i$. This means that also $C^i$ and HF match. Hence, since $DD^H=I$, the CSI-RS virtualization F will be inverted and the desired codebook will be applied to the element-space channel H.

The UE is then able to inform the base station of the index i of the selected precoder Ci. Data may then be transmitted based on the recommended precoder index. The received data at the UE may then be represented as:

$$y_{Data} = HC_{desired}^i x_{Data} + n. \quad (15)$$

Hence, by including D both in the codebook C and the virtualization F, it is possible to transmit precoded CSI-RS but still let the UE recommend a precoder corresponding to an oversampled DFT codebook.

The method allows the UE to select a beam not belonging to the predefined DFT matrix, allowing a finer granularity. This allows an improvement in spatial resolution.

Figure 9:
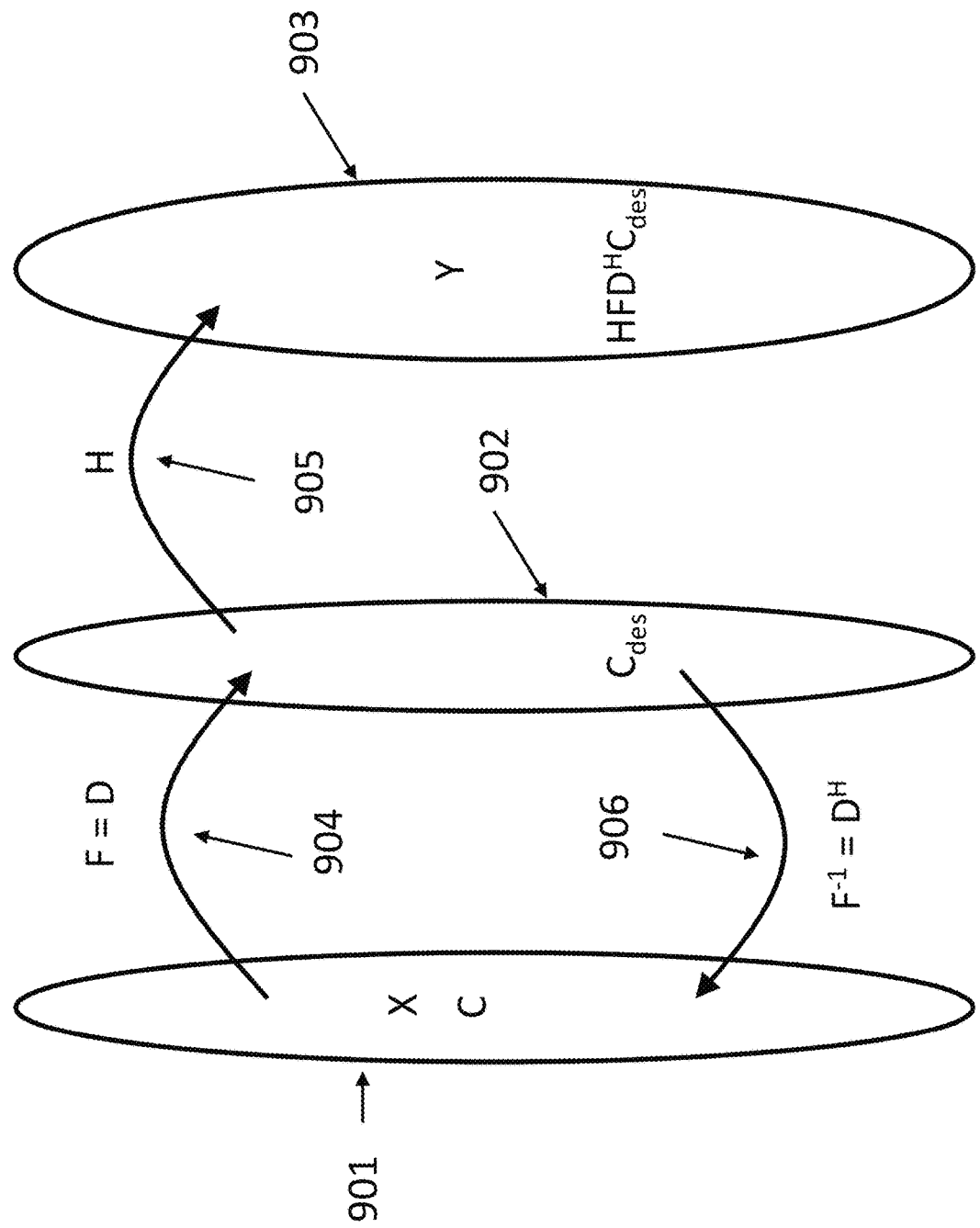
FIG. 9 is a diagram representing the operations applied to the signal components.

FIG. 9 is a set diagram representing the signal components and operations applied to these. The signal to be transmitted X is located in a first space 901, and is mapped to an element in a second space 902 by the virtualization matrix F, shown as a first transformation 904. The virtualized signal is then transmitted by the antenna array and is subject to the effects of the channel matrix H, shown as a second transformation 905, which maps it to an element in a third space 903. The result is the received signal Y at the receiver. The relationship between the received signal and the virtualization matrix, channel matrix and desired precoders is shown. A third transformation 906 being the inverse of the first transformation (virtualization matrix) is also illustrated. In a similar manner, as explained above, it may be appreciated that the precoder recommended by the UE is an element of the third space 903, which is the image of the desired precoder $C_{des}$ under a composite mapping composed of the third transformation 906, the first transformation 904 and the second transformation 905.

Figure 10:
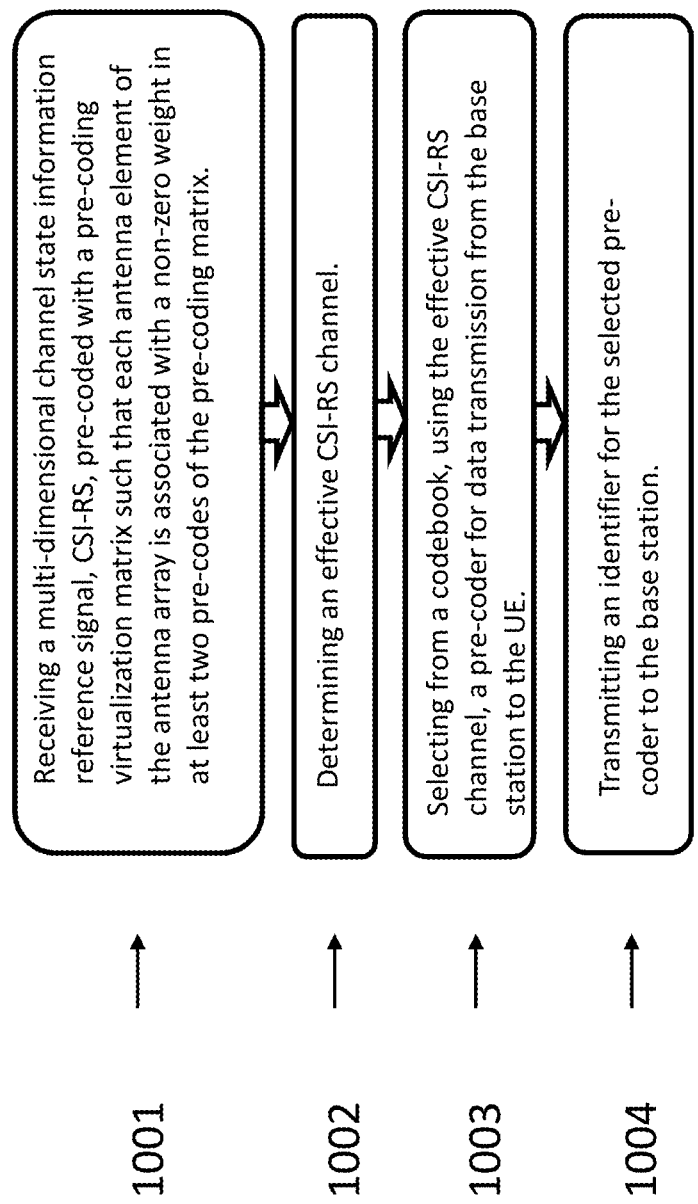
FIG. 10 is a flow chart illustrating the steps of a method according to an embodiment.

FIG. 10 is a flow chart illustrating the steps of a method according to an embodiment. At the User Equipment, a multi-dimensional channel state information reference signal, CSI-RS is received 1001. The CSI-RS is precoded with a precoding virtualization matrix such that each antenna element of the antenna array is associated with a non-zero weight in at least two precoders of the precoders used for transmitting the reference signal. An effective CSI-RS channel is determined 1003. Using the effective CSI-RS channel, a precoder for data transmission from the base station to the UE is selected 1003 from a codebook. An identifier for the selected precoder is then transmitted 1004 to the base station.

Figure 11:
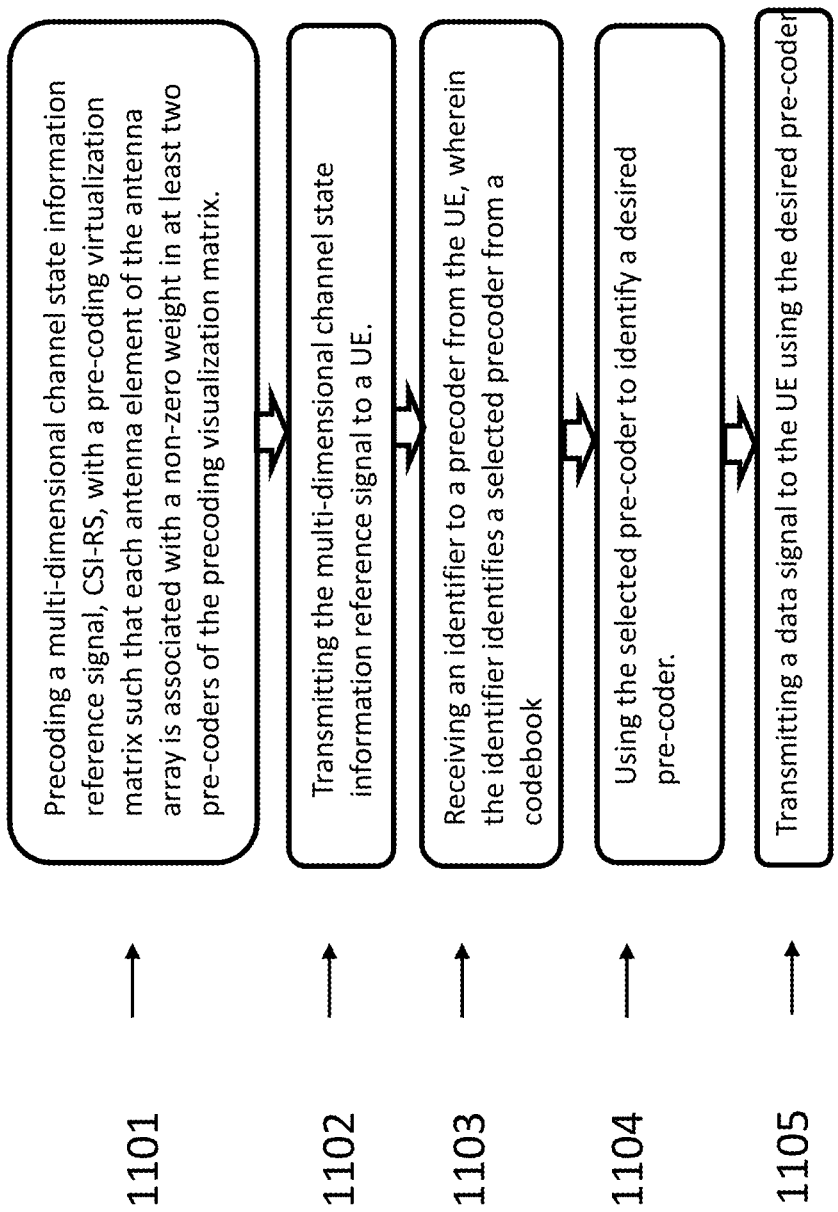
FIG. 11 is a flow chart illustrating the steps of a method according to an embodiment.

FIG. 11 is a flow chart illustrating a method performed at a base station according to an embodiment. A multi-dimensional channel state information reference signal is precoded 1101 with a precoding virtualization matrix such that each antenna element of the antenna array has a non-zero weight in at least two precoders of the precoders used for transmitting the reference signal, and the multi-dimensional channel state information reference signal is transmitted 1102 to the UE. An identifier to a precoder is received 1104 for from the UE, which is used 1104 to identify a desired precoder. A data signal is precoded with the desired precoder 1105 and the precoded data signal is then transmitted to the UE.

Figure 12:
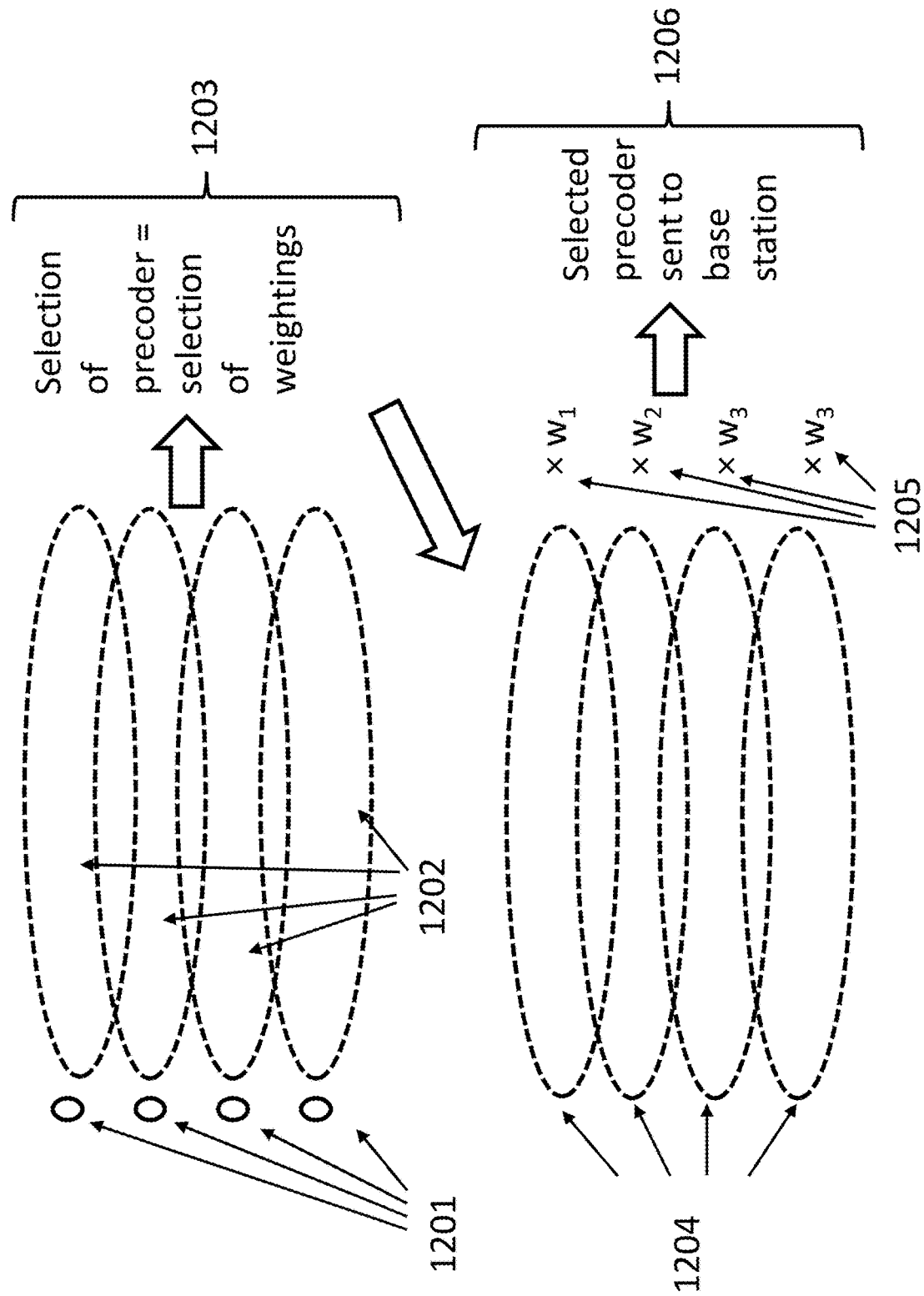
FIG. 12 is a diagram illustrating the selection of a precoder.

FIG. 12 is a diagram illustrating the selection of a precoder. A set of beams 1202 is transmitted from a plurality of antennas 1201. A selection of a precoder is made 1203. This comprises selecting a set of weightings 1205 for the available beams 1204. This information is then transmitted to the base station 1206. The precoder codebook comprises two types of precoder, a port selection precoder and a port combination precoder. The port selection precoder comprises a precoder based on a beam form one of the base station ports. The port combination precoder comprises a linear combination of a selection of such ports, with a weighting assigned to each port.

In an embodiment, a less advanced UE is used. The less advanced UE selects and reports precoders corresponding to antenna ports instead of precoders corresponding to $C_{desired}$. The transmitted CSI-RS is received as $Y_{CSI-RS}=HFX_{CSI-RS}+$ N. If a UE therefore reports the most beneficial column of $Y_{CSI-RS}$, this will enable the most beneficial antenna port to be identified and will provide an efficient precoder choice among the precoders contained in F.

Figure 13:
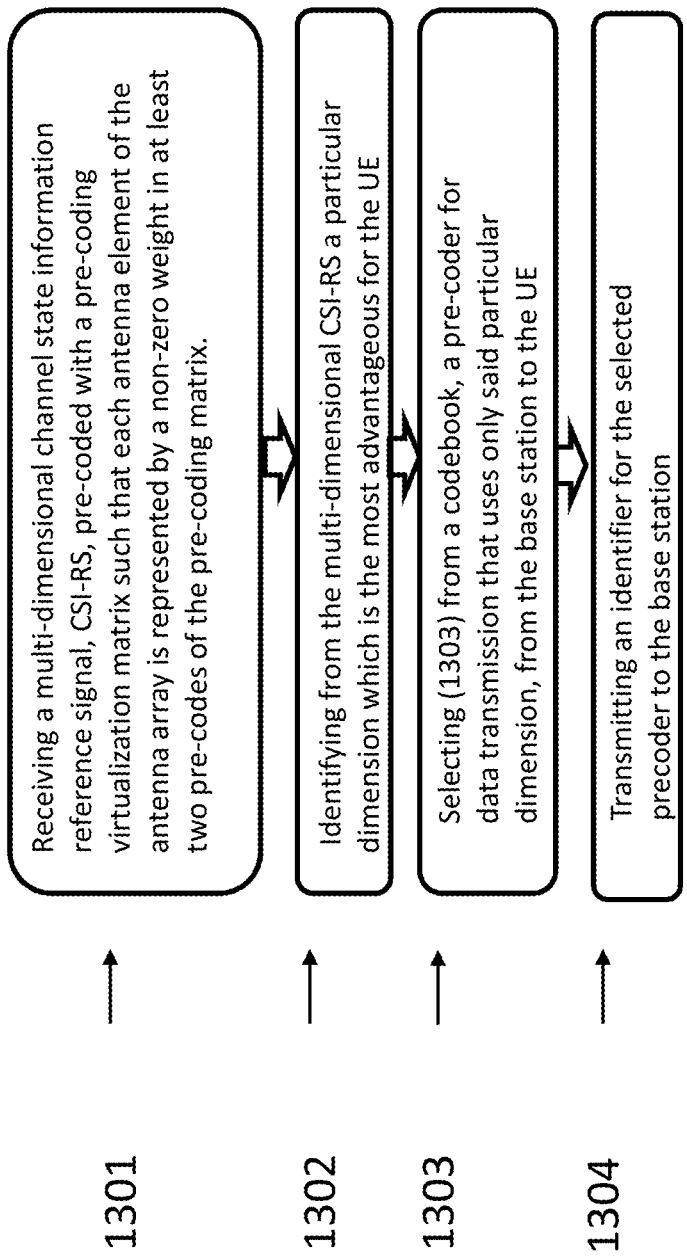
FIG. 13 is a flow chart illustrating the steps of a method according to an embodiment.

Thus, with the proposed codebook structure both less advanced and more advanced UE categories can benefit. The advanced UEs will be able to recommend precoders corresponding to oversampled DFT vectors whereas the less advanced UEs may recommend the best out of the N DFT vectors in F. This enables a backward compatibility with UEs not adapted to the method. FIG. 13 is a flow chart illustrating the method to a less advanced UE according to an embodiment. The method comprises receiving 1301 a multi-dimensional channel state information reference signal, CSI-RS, precoded with a precoding virtualization matrix such that each antenna element of the antenna array is represented by a non-zero weight in at least two precoders of the precoding matrix. The UE identifies 1302 from the multi-dimensional CSI-RS a particular dimension which is the most advantageous for the UE. In an embodiment, a dimension corresponds to the beam from an antenna port. The UE selects 1303 from a codebook, a precoder for data transmission that uses only said particular dimension, from the base station to the UE. The identifier is then transmitted 1304 to the base station. The method enables both types of UE, implementing the embodiments of FIG. 10 and FIG. 13 to co-exist within a cell.

In an embodiment, the codebook used for providing an identifier to base station, as defined in equation x, can be expressed as:

$$[C]_{l,n} = D(:,l)^H C_{desired}(:,n) = \sum_{k=0}^{N-1} [D]_{k,l}^* \cdot [C_{desired}]_{k,n} \quad (16)$$

Wherein $\Sigma_{k=0}^{N-1}[D]_{k,l}^*$ represents the virtualization matrix and $[C_{desired}]_{k,n}$ represents the desired precoders. In an embodiment, the code book has the following entries:

$$[C]_{l,n} = \frac{1}{N}\sum_{k=0}^{N-1} \exp\left(-\frac{j2\pi kl}{N}\right)\exp\left(\frac{j2\pi kn}{ON}\right) \quad (17)$$

Wherein N is the number of antennas and O is the oversampling factor. Equation can be rearranged as follows:

$$[C]_{l,n} = \frac{1}{N}\sum_{k=0}^{N-1} \exp\left(\frac{j2\pi k\left(\frac{n}{O}-l\right)}{N}\right) \quad (18)$$

$$[C]_{l,n} = =\frac{1}{N}\sum_{k=0}^{N-1} \exp(jX)^k \quad (19)$$

where $$X = \frac{2\pi\left(\frac{n}{O}-l\right)}{N}.$$

Equation can be rewritten using the formula for geometric series:

$$\sum_{k=0}^{N-1} \exp(jX)^k = \frac{1-\exp(jNX)}{1-\exp(jX)} = \exp\left(\frac{j(N-1)}{2}X\right) \cdot \frac{\sin\left(\frac{XN}{2}\right)}{\sin\left(\frac{X}{2}\right)} \quad (20)$$

And by inserting $$X = \frac{2\pi\left(\frac{n}{O}-l\right)}{N}$$

the result is:

$$[C]_{l,n} = \frac{1}{N}\exp\left(\frac{j\pi(N-1)}{N}\left(\frac{n}{O}-l\right)\right) \cdot \frac{\sin\left(\pi\left(\frac{n}{O}-l\right)\right)}{\sin\left(\frac{\pi\left(\frac{n}{O}-l\right)}{N}\right)} \quad (21)$$

If mod(n,O)=0:

$$[C]_{l,n} = \begin{cases} 1 & l=n \\ 0 & l \neq n \end{cases} \quad (22)$$

so that the precoder is a column from an identity matrix, merely selecting one of the transmitted CSI-RS beams. To avoid having to account for the 0/0 limit further, it is assumed that mod(n,O)≠0.

Expanding the numerator using trigonometric rules gives:

$$\sin\left(\pi\left(\frac{n}{O}-l\right)\right) = \sin\left(\frac{\pi n}{O}\right)\cos(\pi l) - \sin(\pi l)\cos\left(\frac{\pi n}{O}\right) = \sin\left(\frac{\pi n}{O}\right)\exp(j\pi l), \quad (23)$$

since $\sin(\pi l)=0$ and $\cos(\pi l)=\exp(j\pi l)$.

Any factor that only depends on the column index n can be removed since it will not change the precoding properties. This is because a precoder matrix can be multiplied by an arbitrary scalar without changing the precoding properties. The precoding properties are only affected by the relative phases and amplitudes between the antennas. The factor exp $$\left(\frac{j\pi(N-1)}{N}\frac{n}{O}\right)$$

can therefore be removed from $[C]_{l,n}$ and result is:

$$[\tilde{C}]_{l,n} = \frac{1}{N}\exp\left(\frac{-j\pi(N-1)}{N}l\right) \cdot \frac{\exp(j\pi l)\sin\left(\frac{\pi n}{O}\right)}{\sin\left(\frac{\pi\left(\frac{n}{O}-l\right)}{N}\right)} = \quad (24)$$

$$\exp\left(\frac{j\pi l}{N}\right) \cdot \frac{1}{N} \frac{\sin\left(\frac{\pi n}{O}\right)}{\sin\left(\frac{\pi\left(\frac{n}{O}-l\right)}{N}\right)}$$

In an embodiment, the precoder can thus be split into two components, one phase component and one "Dirichlet" component. The latter scales the amplitude and, in an embodiment, phase shifts 180°. The components are written as φ(l) and A(n,l), in this order. In an embodiment, the precoders can be written as:

$$[\tilde{C}]_{l,n} = \varphi(l) \cdot A(n,l) \quad (25)$$

The phase component depends only upon the row (i.e. the antenna port index) and is thus the same for all columns (and thus precoders), constituting a DFT precoder across the antenna ports.

In an embodiment, the codebook is further simplified by exploiting symmetries in the Dirichlet component.

A substitution n=O·l'+q can be made, which alters the numerator of A(n,l) as follows:

$$\sin\left(\frac{\pi n}{O}\right) = \sin\left(\frac{\pi(Ol'+q)}{O}\right) = \quad (26)$$

$$\sin(\pi l')\cos\left(\frac{\pi q}{O}\right) + \cos(\pi l')\sin\left(\frac{\pi q}{O}\right) = (-1)^{l'} \cdot \sin\left(\frac{\pi q}{O}\right)$$

Since the sign is flipped on the entire precoder with $(-1)^{l''}$, this component can be removed since it does not affect the precoding properties.

Substituting similarly also in the denominator results in:

$$\sin\left(\frac{\pi\left(\frac{n}{O}-l\right)}{N}\right) = \sin\left(\frac{\pi q}{ON} + \frac{\pi(l'-l)}{N}\right) = \sin\left(\frac{\pi q}{ON} + \frac{\pi\Delta l}{N}\right), \quad (27)$$

The Dirichlet component can thus be simplified to depend only on the oversampling index q and the difference $\Delta l = l' - l$, so that $$A_q(\Delta l) = \frac{1}{N} \frac{\sin\left(\frac{\pi q}{O}\right)}{\sin\left(\frac{\pi q}{ON} + \frac{\pi\Delta l}{N}\right)}, \Delta l = -(N-1), \ldots 0, \ldots N-1. \quad (28)$$

I.e. $A(n,l) = A(Ol'+q,l) = A_q(l'-l) = A(\Delta l)$ according to above.

Because of the periodicity of the sine function, $A_q(\Delta l + N) = -A_q(\Delta l)$ and so, it is enough to look at $A_q(\Delta l)$ for $\Delta l = 0, \ldots, N-1$.

In an embodiment therefore, the precoders for a certain q can be described as $$\tilde{C}_q = \mathrm{diag}(d) \cdot T_q$$

wherein:

$$d = \begin{bmatrix} \exp\left(\frac{j\pi \cdot 0}{N}\right) \\ \exp\left(\frac{j\pi \cdot 1}{N}\right) \\ \vdots \\ \exp\left(\frac{j\pi(N-1)}{N}\right) \end{bmatrix} \quad (29)$$

is a specific DFT vector and $$T_q = \begin{bmatrix} A_q(0) & A_q(1) & \ldots & A_q(N-1) \\ -A_q(N-1) & A_q(0) & \ldots & A_q(N-2) \\ \vdots & \vdots & \ddots & \vdots \\ -A_q(1) & -A_q(2) & \ldots & A_q(0) \end{bmatrix} \quad (30)$$

is a kind of Toeplitz matrix: a circulant matrix but where the lower-triangular entries are negated.

Hence, in an embodiment, the total precoder codebook can thus be described by the matrix $$C = [I_N \mathrm{diag}(d) \cdot T_1 \ldots \mathrm{diag}(d) \cdot T_{O-1}] \quad (31)$$

where $I_N$ is an identity matrix.

Therefore, in an embodiment, the codebook consists of two types of precoders, either an antenna port is just selected and data is transmitted using one of the CSI-RS DFT beams, or, the beams are combined to create an oversampled DFT beam with finer precision.

Figure 14:
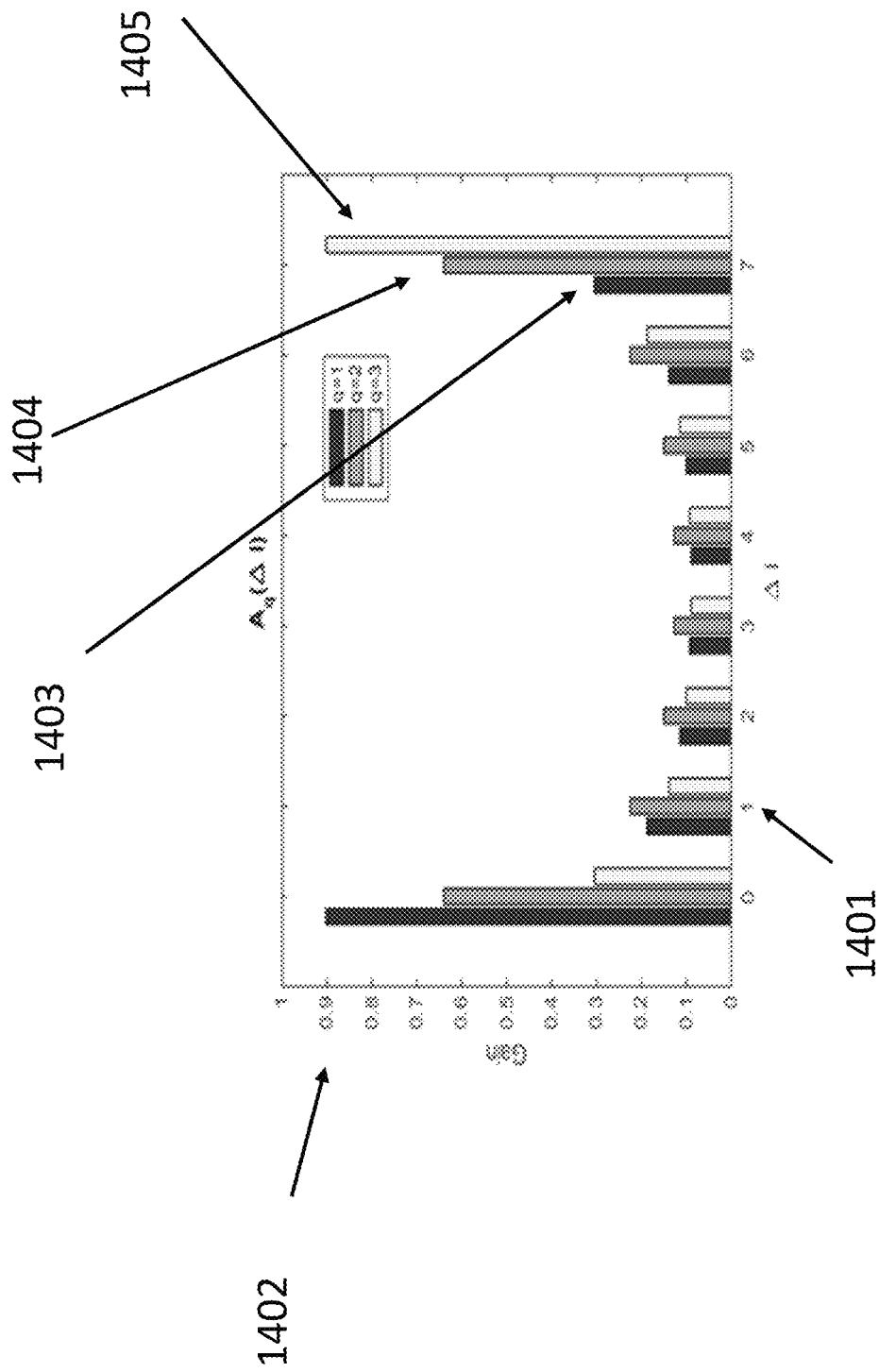
FIG. 14 is a graphical representation of amplitude scaling for precoders according to an embodiment.

FIG. 14 is a graphical representation of amplitude scaling for a system with an antenna array comprising 4 antenna elements and with an oversampling factor of 4. The amplitude scaling factor is given as a function of for three different values of the oversampling index. The graph plots gain 1401 against $\Delta l$ 1402 for three different q values 1403, 1404, 1405.

In an embodiment, the antenna array comprises a plurality of subarrays. In an embodiment, the array structure comprises a one dimensional array comprising N single polarised antenna elements, each divided into N1 subarrays with N2 antenna elements within each subarray. In an embodiment, a Kronecker structure may be used as the virtualization matrix:

$$F = F_1 \otimes F_2^i \quad (32)$$

Wherein $F_1$ is a virtualization matrix for the one-dimensional array, and $F_2$ is a virtualization matrix for each of the subarrays. In an embodiment, $F_1$ is an arbitrary invertible matrix. This allows, by using the CSI-RS virtualization matrix F as $$y_{CSI-RS} = HFx_{CSI-RS} + n \quad (33)$$

the UE to use a codebook as $C = F^H C_{desired}$. In an embodiment, the choice of $F_1$ is a unitary matrix. In an alternative embodiment, $F_1$ is a DFT matrix. In another embodiment, $F_1$ is a Welsh matrix. In yet another embodiment, $F_1$ is a Hadamard matrix.

Figure 15:
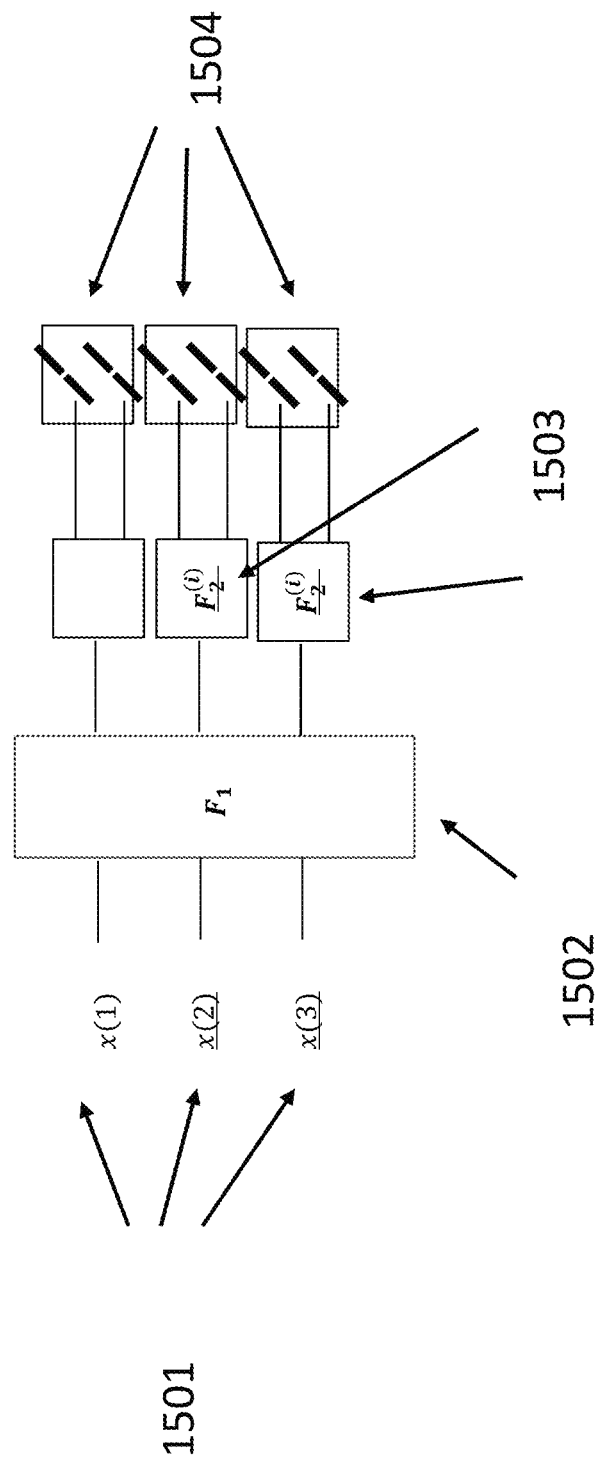
FIG. 15 is a schematic diagram illustrating two stage virtualization according to an embodiment.

In an embodiment, the subarrays of the antenna array use an analog implementation, meaning that only a wideband subarray virtualization can be used, i.e. only one column of $F_2$ may be transmitted on each time slot, whereas the subarrays are combined in a digital manner, meaning that a frequency-selective "combining virtualization" $F_1$ may be used. In one embodiment, the CSI-RS is multiplexed in the frequency domain such that more than one CSI-RS corresponding to column i in $F_2$ is transmitted at a given time instant. In one embodiment CSI-RS corresponding to all the columns $F = F_1 \otimes F_2^i$ are transmitted where $F_2^i$ represents the $i^{th}$ column of $F_2$. FIG. 15 is a schematic diagram illustrating such an embodiment. CSI-RS signals 1501 have a combining virtualization $F_1$ applied 1502 followed by a virtualization for the subarrays represented by matrix $F_2$ 1503. The CSI-RS signals are then transmitted by means of the subarrays 1504. This will hence enable multiplexing of the digital ports of the antenna in the frequency domain whereas the analog part is multiplexed in the time domain.

Figure 16:
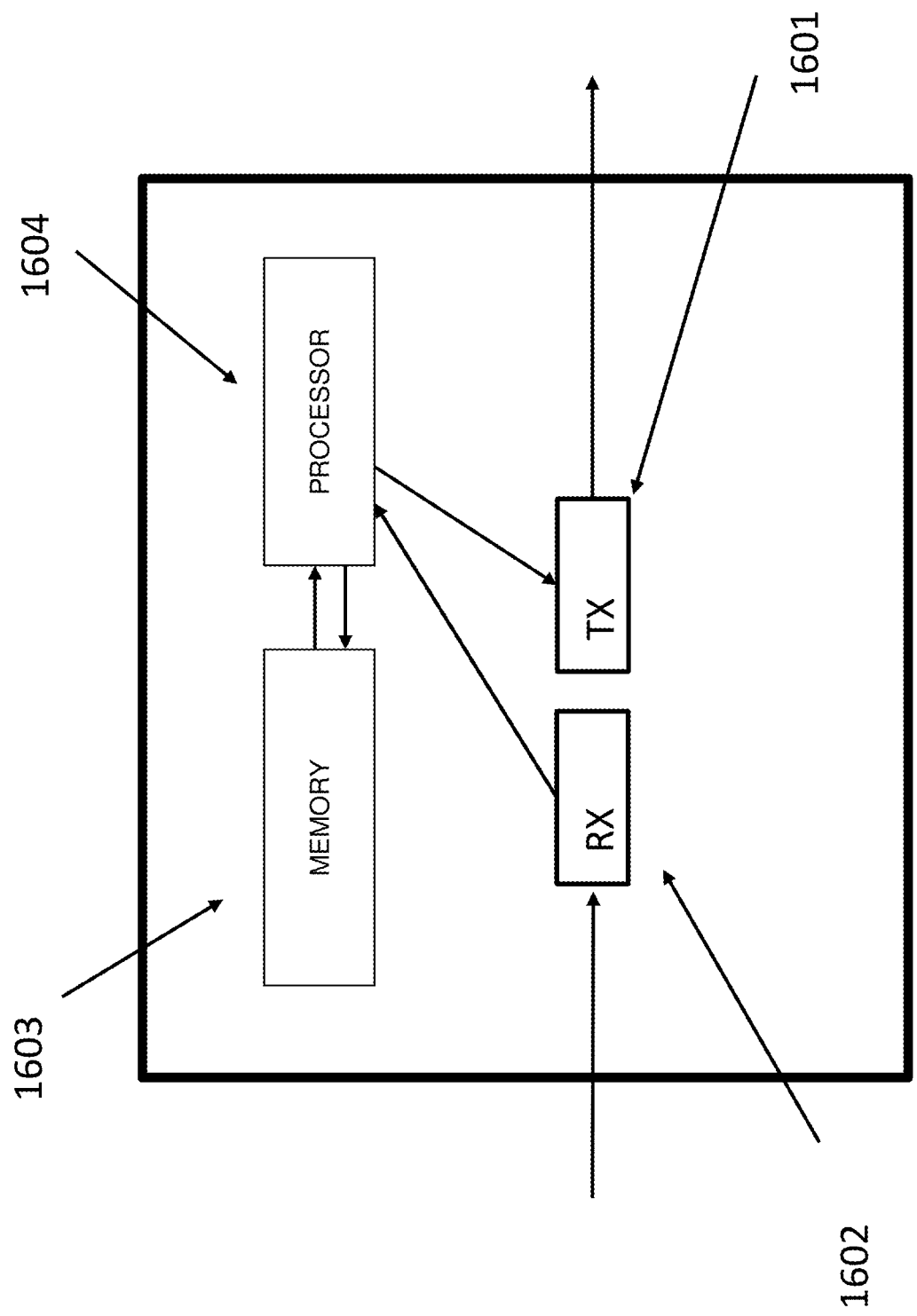
FIG. 16 is a schematic diagram of an apparatus for use in a base station according to an embodiment.

FIG. 16 is a schematic diagram of an apparatus 1600 for use in a base station according to an embodiment. The apparatus comprises transmitter 1601, a receiver 1602, a memory 1603 and a processor 1604. The transmitter 1601 and the receiver 1602 both comprise antenna arrays.

Figure 17:
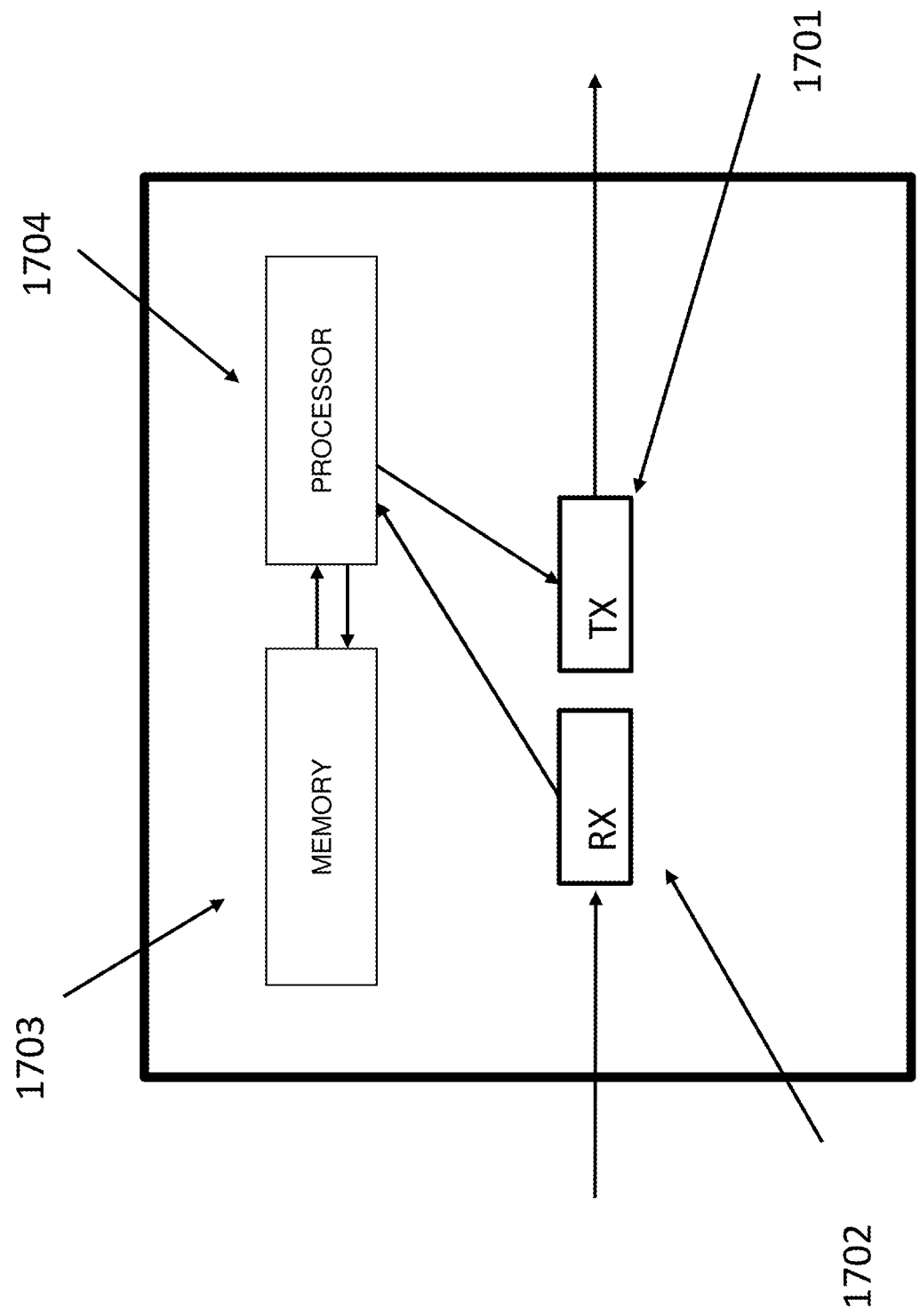
FIG. 17 is a schematic diagram of an apparatus for use in a base station according to an embodiment.

FIG. 17 is a schematic diagram of an apparatus 1700 for use in a base station according to an embodiment. The apparatus comprises transmitter 1701, a receiver 1702, a memory 1703 and a processor 1704. The transmitter 1701 and the receiver 1702 both comprise antenna arrays. In an embodiment, the transmitter is a one-dimensional array. In another embodiment, the transmitter is a two-dimensional array. In yet another embodiment, the transmitter is an array of subarrays. In an embodiment, the receiver is a one-dimensional array. In another embodiment, the receiver is a two-dimensional array. In yet another embodiment, the receiver is an array of subarrays.

Figure 18:
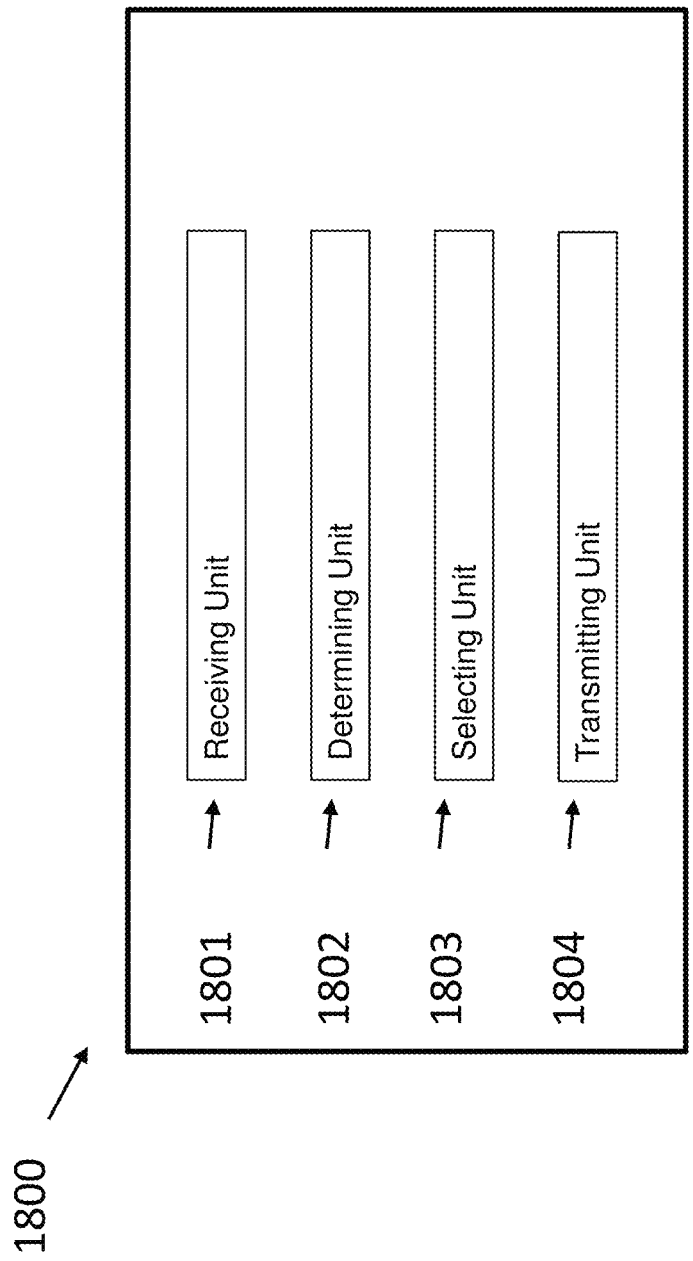
FIG. 18 is a schematic diagram illustrating the logical units of an apparatus for use in a user equipment according to an embodiment.

FIG. 18 is a schematic diagram illustrating the logical units of an apparatus 1800 for use in a user equipment according to an embodiment. The user equipment is for use in a radio communications network comprising a base station and at least one user equipment, UE, wherein the base station comprises an antenna array comprising a plurality of antenna elements. The apparatus comprises a receiving unit 1801, for receiving multi-dimensional channel state information reference signal, CSI-RS, precoded with a precoding virtualization matrix such that each antenna element of the antenna array has a non-zero weight in at least two precoders of the precoders used for transmitting the reference signal, a determining unit 1802 for determining an effective CSI-RS channel, a selecting unit 1803 for selecting from a codebook, using the effective CSI-RS channel, a precoder for data transmission from the base station to the UE, and a transmitting unit 1804 transmitting an identifier for the selected precoder to the base station.

Figure 19:
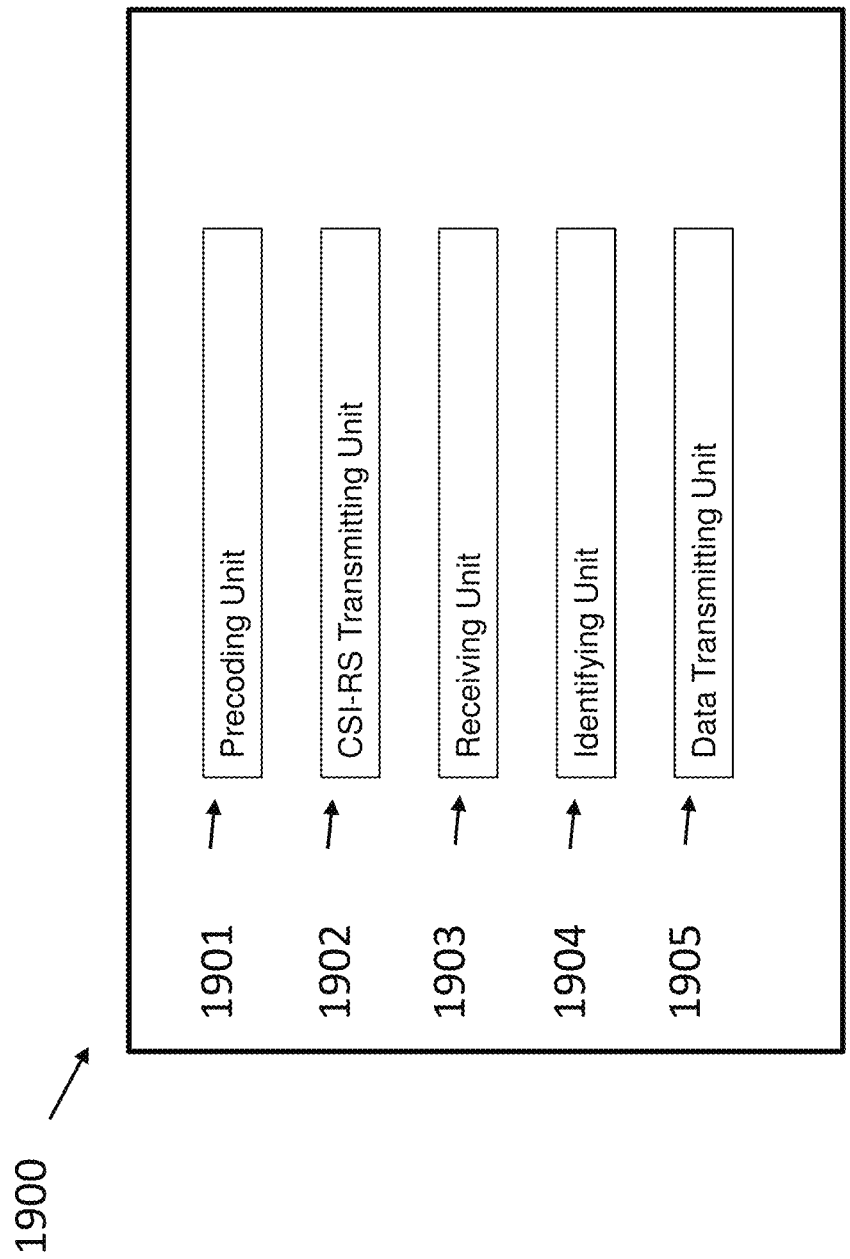
FIG. 19 is a schematic diagram illustrating the logical units of an apparatus for use in a base station according to an embodiment.

FIG. 19 is a schematic diagram illustrating the logical units of an apparatus 1900 for use in a base station according to an embodiment. The base station is for use in a radio communications network comprising a base station and at least one user equipment, UE, wherein the base station comprises an antenna array comprising a plurality of antenna elements. The apparatus comprises a precoding unit 1901, for precoding a multi-dimensional channel state information reference signal with a precoding virtualization matrix such that each antenna element of the antenna array has a non-zero weight in at least two precoders of the precoders used for transmitting the reference signal, a CSI-RS transmitting unit 1902 for transmitting the multi-dimensional channel state information reference signal to a UE, a receiving unit 1903 for receiving the identifier from the UE, an identifying unit 1904 for using the selected precoder to identify a desired precoder, and a data transmitting unit 1905 for transmitting a data signal to the UE using the desired precoder.

Figure 20:
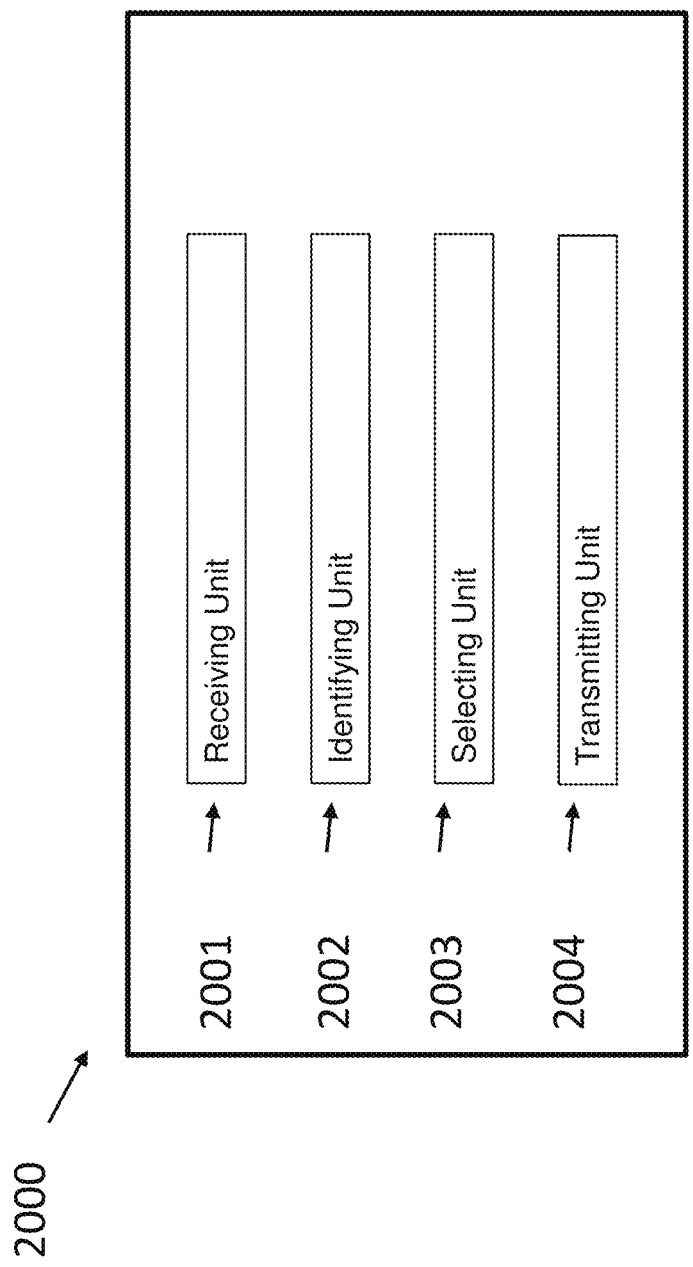
FIG. 20 is a schematic diagram illustrating the logical units of an apparatus for use in a user equipment according to an embodiment.

FIG. 20 is a schematic diagram illustrating the logical units of an apparatus 2000 for use in a user equipment according to an embodiment. The user equipment is a less advanced model than that of the embodiment of FIG. 19. The apparatus comprises a receiving unit 2001, for receiving multi-dimensional channel state information reference signal, CSI-RS, precoded with a precoding virtualization matrix such that each antenna element of the antenna array has a non-zero weight in at least two precoders of the precoders used for transmitting the reference signal, an identifying unit 2002 for identifying from the multi-dimensional CSI-RS a column matrix which is the most advantageous for the UE, a selecting unit 2003 for selecting from a codebook, a precoder for data transmission from the base station to the UE and a transmitting unit 2004 for transmitting an identifier for the selected precoder to the base station.

The present disclosure has mainly been described above with reference to a few embodiments. However, as is readily appreciated by a person skilled in the art, other embodiments than the ones disclosed above are equally possible within the scope of the present disclosure, as defined by the claims.

The invention claimed is:

1. A method in a radio communications network, the network comprising a base station with an antenna array comprising a plurality of antenna elements, the method comprising, at the base station:
   precoding a multi-dimensional channel state information reference signal (CSI-RS) with a precoding virtualization matrix such that each antenna element of the antenna array is associated with a non-zero weight in at least two precoders of the precoding virtualization matrix;
   transmitting the multi-dimensional CSI-RS to a user equipment (UE) operating in the network;
   receiving an identifier from the UE, wherein the identifier identifies a selected precoder from a codebook;
   using the selected precoder to identify a desired precoder; and
   transmitting a data signal to the UE using the desired precoder.

2. The method according to claim 1, wherein the precoding virtualization matrix represents a discrete Fourier transform (DFT) precoder.

3. The method according to claim 1, wherein using the selected precoder to identify a desired precoder further comprises using the precoding virtualization matrix.

4. The method according to claim 1, wherein the codebook comprises a plurality of precoders, calculated by matrix multiplication of a matrix comprising a plurality of desired precoders with an inverse matrix of the precoding virtualization matrix.

5. The method according to claim 1, wherein the antenna array comprises a first array, and the first array comprises a plurality of subarrays.

6. The method according to claim 5, wherein the precoding virtualization matrix is a Kronecker product of a virtualization matrix for the first array and a virtualization matrix for the subarrays.

7. The method according to claim 1, wherein the codebook comprises two types of precoder, a port selection precoder and a port combination precoder.

8. The method according to claim 1, further comprising, at the UE:
   receiving the multi-dimensional CSI-RS;
   determining an effective CSI-RS channel;
   selecting from a codebook, using the effective CSI-RS channel, the precoder for data transmission from the base station to the UE; and
   transmitting the identifier for the selected precoder to the base station.

9. The method according to claim 1, further comprising, at the UE:
   receiving the multi-dimensional CSI-RS;
   identifying from the multi-dimensional CSI-RS, a particular dimension that is the most advantageous for the UE;
   selecting from a codebook, the precoder for data transmission that uses only said particular dimension, from the base station to the UE; and
   transmitting the identifier for the selected precoder to the base station.

10. A method implemented by a user equipment (UE) operating in a radio communications network, the network comprising a base station with an antenna array comprising a plurality of antenna elements, the method comprising:
   receiving a multi-dimensional channel state information reference signal (CSI-RS) precoded with a precoding virtualization matrix such that each antenna element of the antenna array is associated with a non-zero weight in at least two precoders of the precoding matrix;
   determining an effective CSI-RS channel;
   selecting from a codebook, using the effective CSI-RS channel, a precoder for data transmission from the base station to the UE; and
   transmitting an identifier for the selected precoder to the base station.

11. A base station configured for operation in a radio communications network and comprising an antenna array having a plurality of antenna elements, the base station further comprising:
   a transmitter;
   a receiver;
   a memory; and a processor configured to execute instructions stored in the memory that cause the base station to:
  transmit a plurality of channel state information reference signals (CSI-RS) precoded with precoders such that each antenna element of the antenna array has a non-zero weight in at least two precoders among precoders used for transmitting CSI-RSs;
  receive an identifier from a UE, wherein the identifier identifies a selected precoder from a codebook;
  use the selected precoder to identify a desired precoder; and
  transmit a data signal to the UE using the desired precoder.

12. A user equipment (UE) configured for operation in a radio communications network that includes a base station comprising an antenna array having a plurality of antenna elements, the UE comprising:
  a transmitter;
  a receiver;
  a memory; and
  a processor configured to execute instructions stored in the memory that cause the UE to:
    receive a plurality of channel state information reference signals (CSI-RS) precoded with precoders such that each antenna element of the antenna array has a non-zero weight in at least two precoders among precoders used for transmitting CSI-RSs;
    estimate an effective CSI-RS channel;
    select from a codebook, using the effective CSI-RS channel, a precoder for data transmission from the base station to the UE; and
    transmit an identifier for the selected precoder to the base station.

13. A non-transitory computer readable medium storing a computer program, comprising instructions that, when executed on at least one processor of a base station with an antenna array comprising a plurality of antenna elements, cause the at least one processor to:
  precode a multi-dimensional channel state information reference signal (CSI-RS) with a precoding virtualization matrix such that each antenna element of the antenna array is associated with a non-zero weight in at least two precoders of the precoding virtualization matrix;
  transmit the multi-dimensional CSI-RS to a user equipment (UE) configured for operation in a radio communications network comprising the base station;
  receive an identifier from the UE, wherein the identifier identifies a selected precoder from a codebook;
  use the selected precoder to identify a desired precoder; and
  transmit a data signal to the UE using the desired precoder.

14. A non-transitory computer readable medium storing a computer program, comprising instructions that, when executed on at least one processor of a user equipment (UE) configured for operation in a radio communications network comprising a base station with an antenna array comprising a plurality of antenna elements, the instructions causing the at least one processor to:
  receive a multi-dimensional channel state information reference signal (CSI-RS) precoded with a precoding virtualization matrix such that each antenna element of the antenna array is associated with a non-zero weight in at least two precoders of the precoding matrix;
  determine an effective CSI-RS channel;
  select from a codebook, using the effective CSI-RS channel, a precoder for data transmission from the base station to the UE; and
  transmit an identifier for the selected precoder to the base station.

* * * * *